(12) United States Patent
Okanaka et al.

(10) Patent No.: US 6,799,753 B2
(45) Date of Patent: Oct. 5, 2004

(54) FLUID-FILLED ELASTIC MOUNT

(75) Inventors: Takehiro Okanaka, Kasugai (JP); Fumiaki Hashimoto, Niwa-gun (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/260,214

(22) Filed: Sep. 27, 2002

(65) Prior Publication Data

US 2003/0075848 A1 Apr. 24, 2003

(30) Foreign Application Priority Data

Sep. 28, 2001 (JP) ........................................ 2001-303106
Feb. 4, 2002 (JP) ........................................ 2002-027362

(51) Int. Cl.[7] ................................................ F16M 5/00
(52) U.S. Cl. ............................ 267/140.13; 267/140.11; 267/35
(58) Field of Search ................. 267/140.13, 140.11, 267/219, 220, 35, 141.1–141.5; 248/562, 636

(56) References Cited

U.S. PATENT DOCUMENTS

| 5,259,598 | A | * | 11/1993 | Hibi et al. ............. | 267/140.13 |
| 5,269,498 | A |   | 12/1993 | Bretaudeau et al. |   |
| 6,390,458 | B2 |   | 5/2002 | Okanaka et al. |   |
| 6,523,814 | B2 | * | 2/2003 | Kodama et al. ....... | 267/140.13 |
| 6,634,628 | B2 | * | 10/2003 | Takashima et al. .... | 267/140.13 |

FOREIGN PATENT DOCUMENTS

| FR | 0500432 A1 | * | 8/1992 | ............ 267/140.13 |
| JP | 63-11944 |   | 1/1988 |   |
| JP | 63-167142 |   | 7/1988 |   |
| JP | 63-193141 |   | 12/1988 |   |
| JP | 2-21633 |   | 6/1990 |   |
| JP | 4-334625 |   | 11/1992 |   |
| JP | 7-180743 |   | 7/1995 |   |
| JP | 8-145113 |   | 6/1996 |   |
| JP | 3265865 |   | 1/2002 |   |

* cited by examiner

Primary Examiner—Matthew C. Graham
Assistant Examiner—Mariano Sy
(74) Attorney, Agent, or Firm—Beyer Weaver & Thomas, LLP

(57) ABSTRACT

A fluid-filled elastic mount of suspension type, wherein a lower open-end of a cylindrical portion of a second mounting member is fluid-tightly closed by a first mounting member and a tapered elastic body interposed therebetween, extending from the lower open-end into the cylindrical portion. An upper open-end portion of the cylindrical portion is closed by a flexible layer for forming a fluid-filled chamber between the elastic body and the flexible layer and being divided by a partition member into a pressure-receiving chamber defined by the elastic body and an equilibrium chamber defined by the flexible layer, which are held in communication by an orifice passage An elastic restricting projection is bonded to the partition member to protrude and be located in an intermediate portion between the radially opposite elastic body and the cylindrical portion, for restricting an annular region of the intermediate portion.

15 Claims, 17 Drawing Sheets

PRIOR ART

FLUID-FILLED ELASTIC MOUNT

INCORPORATED BY REFERENCE

The disclosure of Japanese Patent Applications No. 2001-303106 filed on Sep. 28, 2001, and No. 2002-027362 filed on Feb. 4, 2002, each including the specification, drawings and abstract, are incorporated herein by reference in their entirety.

BACKGROUND OF THE INVENTION

1. Field of the Invention

The present invention relates generally to a fluid-filled elastic mount adapted to exhibit a vibration-damping effect on the basis of flows of a fluid filling a fluid chamber thereof, and more particularly to such a fluid-filled elastic mount that is novel in construction and that is suitably usable as an engine mount, a body mount or other mounts for use in automotive vehicles.

2. Description of the Related Art

A suspension-type fluid-filled elastic mount is known as one type of an elastic mount interposed between two members of a vibration system for flexibly connecting these two members in a vibration-damping or isolating fashion. As disclosed in JP-A-63-167142 and JP-A-4-334625, the known suspension-type fluid-filled elastic mount elastically supports a vibrative member, e.g., a power unit of an automotive vehicle, with respect to a subject member whose vibration is to be damped, e.g., a body of the vehicle, by suspending the vibrative member from the subject member. FIG. 24 shows an example of the known suspension-type fluid-filled elastic mount, by way of example, in which a first mounting member 150 attachable to the power unit and a second mounting member 152 attachable to the body are elastically connected with each other by a tapered rubber elastic body 156 disposed between the first mounting member and a lower open-end portion of a vertically extending cylindrical portion 154 of the second mounting member 152 into which the first mounting member 150 is inserted so as to extend into the cylindrical portion 154 for fluid-tightly closing the lower open-end portion of the cylindrical portion 154 of the second mounting member 152. An axially upper end portion of the cylindrical portion 154 of the second mounting member 152 is fluid-tightly closed by a flexible layer 158, whereby a fluid chamber 160 is formed between and defined by the rubber elastic body 156 and the flexible layer 158. A partition member 162 is disposed within the fluid chamber 160 so as to extend in a radial direction perpendicular to an axial direction of the cylindrical portion 154 of the second mounting member 152, and is fixedly supported at its peripheral portion by the second mounting member 152, so that the fluid chamber 160 is fluid-tightly divided by the partition member 162 into two sections, namely, a pressure-receiving chamber 164 partially defined by the rubber elastic body 156 and an equilibrium chamber 166 partially defined by the flexible layer 158. The pressure-receiving chamber 164 and the equilibrium chamber 166 are held in fluid communication with each other through an orifice passage 168.

With such a known suspension-type fluid-filled elastic mount installed in position, a static load or weight of the vibrative member, e.g, the power unit, is applied between the first mounting member 150 and the second mounting member 152 in the axial direction, and a vibrational load is primarily applied between the first and second mounting members 150, 152 in the axial direction, as well. Thus, the known suspension-type fluid-filled elastic mount is tuned to be able to exhibit a damping effect based on resonance or flows of the fluid through the orifice passage 168 exclusively to vibrations applied thereto in the axial direction.

However, the known suspension-type fluid-filled elastic mount may possibly be subjected to vibrations applied thereto in the radial directions perpendicular to the axial direction, depending upon a state of installation thereof. If the suspension-type fluid-filled elastic mount is used as an engine mount for an automotive vehicle, for example, the engine mount may be subjected to vibrational loads applied between the first mounting member 150 and the second mounting member 152 in the radial directions, e.g., in a driving or a longitudinal direction of the vehicle and/or in a transverse direction of the vehicle, when the vehicle is accelerated, runs over steps, goes through corners, or experiences any other possible driving conditions. Actually, the known suspension-type fluid-filled elastic mount has not been sufficiently examined in its damping capability with respect to vibrations applied thereto in the radial directions.

In view of the above, the present inventors have conducted extensive studies and researches on damping characteristics of the known suspension-type fluid-filled elastic mount upon application of vibrations thereto in the radial directions, and it has been revealed that the known suspension-type fluid-filled elastic mount is incapable of exhibiting a desired damping effect with respect to vibrations applied thereto in the radial directions. Especially, the suspension-type elastic mount is prone to experience considerable deterioration of its damping capability at around a higher frequency range of input vibrations corresponding to an acceleration noise range of 300–500 Hz.

SUMMARY OF THE INVENTION

It is therefore one object of this invention to provide a suspension-type fluid-filled elastic mount novel in construction and capable of exhibiting an improved damping capability with respect to vibrations applied thereto in a radial direction perpendicular to its axial direction, without deteriorating its damping capability with respect to vibrations applied thereto in the axial direction and its manufacture efficiency due to increase in the number of components or the like.

In an attempt to solve the conventionally experienced problem, the present inventors have been conduced a further extensive study of the suspension-type fluid-filled elastic mount. In the suspension-type fluid-filled elastic mount, the elastic body has a generally frusto-conical shape, and is bonded at its central portion to the first mounting member and at its peripheral portion to the lower open-end portion of the cylindrical portion of the second mounting member, so that the central portion of the elastic body protrudes into an interior space of the cylindrical portion of the second mounting member by a relatively large distance, thereby effectively reducing or preventing occurrence of tensile stress in the elastic body when the elastic mount is installed in position and a static load, e.g., the weight of the power unit acts on the elastic body. When the suspension-type fluid-filled elastic mount constructed as described above is subjected to vibrations applied thereto in radial directions perpendicular to the axial direction, the central portion of the elastic body is forced to be moved back and force or displaced reciprocatively in the radial or diametric directions within the fluid chamber. As a result, an annular region defined by and between the central portion of the elastic body and the cylindrical portion of the second mounting member opposed to the central portion of the elastic body in the radial directions, experiences a volume variation in a circumferential direction thereof, thus causing flows of the fluid in the circumferential direction within the annular region. In view of the above, the present inventors have concluded that the suspension-type fluid-filled elastic mount may suffer from considerable increase in the spring constant based on resonance effect of the fluid flowing through the annular region, upon application of vibrations whose frequency range is higher than a resonance frequency of the fluid flowing through the annular region.

In the light of the above described conclusion, the present inventors have conducted still a further extensive study and research of the suspension-type fluid-filled elastic mount, and then have developed a suspension-type fluid-filled elastic mount according to the present invention. There will be described presently preferred modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A fluid-filled elastic mount of suspension type, including: (a) a first mounting member; (b) a second mounting member including a cylindrical portion extending in a vertical direction and having a vertically lower open-end portion in which the first mounting member is inserted and disposed; (c) a generally tapered elastic body interposed between the first and second mounting member so as to extend from the vertically lower open-end portion of the cylindrical portion of the second mounting member into an inside of the cylindrical portion for fluid tightly closing the vertically lower open-end portion of the cylindrical portion of the second mounting member and for elastically connecting the first mounting member and the cylindrical portion of the second mounting member with each other; (d) a flexible layer fluid-tightly closing a vertically upper open-end portion of the cylindrical portion of the second mounting member for forming a fluid chamber defined between the generally tapered elastic body and the flexible layer and filled with a non-compressible fluid; (e) a partition member disposed within the fluid chamber so as to extend in a generally radial direction perpendicular to an axial direction of the cylindrical portion, and fixedly supported at a peripheral portion thereof by the second mounting member, for fluid-tightly dividing the fluid chamber into a pressure-receiving chamber partially defined by the generally tapered elastic body and an equilibrium chamber partially defined by the flexible layer; (f) an orifice passage for permitting a fluid communication between the pressure-receiving chamber and the equilibrium chamber; and (g) a restricting projection formed of an elastic body and bonded to the partition member so as to protrude into the pressure-receiving chamber and located in an intermediate portion between the generally tapered elastic body and the cylindrical portion of the second mounting member opposed to the generally tapered elastic body in the generally radial direction, for restricting a generally annular region of the intermediate portion.

In the fluid-filled elastic mount constructed according to this mode of the invention, the restricting projection protruding from the partition member, is disposed in the annular region formed between the radially opposed generally tapered elastic body and cylindrical portion of the second mounting member and extending circumferentially in the pressure-receiving chamber, which annular region is considered to form a fluid passage upon application of a radial vibrational load to the elastic mount, so that a cross sectional area of the fluid passage defined by the annular region is reduced or restricted. This arrangement makes it possible to shift a resonance frequency of the fluid flowing through the annular region to a lower frequency range, which does not matter in terms of a vibration-damping capability of the elastic mount. Therefore, the fluid-filled elastic mount constructed according to this mode of the invention is capable of eliminating or moderating a tendency for its dynamic spring constant to considerably increase at a specific frequency range, e g., an acceleration noise in an automotive vehicle, owing the presence of the restricting projection.

Further, the restricting projection is arranged to be spaced away from both of the generally tapered elastic body and the cylindrical portion of the second mounting member as well as is formed of the elastic body, e.g., a rubber elastic body, permitting a relatively easy elastic deformation of the restricting projection. Therefore, the restricting projection is more likely to be elastically deformed by a pressure of the fluid flowing through the annular region functioning as the fluid passage, resulting in disturbance of flows of the fluid through the annular region. Thus, the present fluid-filled elastic mount of the invention can effectively prevent or reduce a possibility of the considerable increase of its dynamic spring constant upon the application of the radial vibrational load thereto, which is considered due to resonance effect of the fluid flowing through the annular region.

Still further, the restricting projection is formed independently of the generally tapered elastic body and bonded to the partition member so as to protrude into the pressure-receiving chamber according to this mode of the invention, thereby effectively preventing an essential damping characteristic of the elastic mount based on the generally tapered elastic body from being adversely effected or deteriorated by the presence of the restricting projection, while sufficiently maintaining operation efficiency in assembling components of the elastic mount.

(2) A fluid-filled elastic mount according to the above-indicated mode (1), wherein the restricting projection has a tapered shape in cross section with a height dimension larger than a width dimension at a proximal end portion thereof. This arrangement further facilitates elastic deformation of the restricting projection. Thus, the fluid-filled elastic mount is capable of further effectively eliminating or moderating the tendency for its dynamic spring constant to increase when being subjected to vibrations applied thereto in the radial directions, with the help of the elastic deformation of the restricting projection.

Preferably, the restricting projection has an outer circumferential surface extending generally straightly in the axial direction, and has an inner circumferential surface extending generally straightly in the axial direction from the proximal end portion to an intermediate portion thereof while extending in a direction inclined to the axial direction from the intermediate portion to an distal end portion thereof such that the inner circumferential surface gradually extends radially outwardly in an axially outward direction. In this arrangement, the proximal end portion of the restricting projection, which is bonded to the partition member, protrudes downwardly from the partition member by a given height dimension with a generally constant width, and the distal end portion of the restricting projection has a tapered cross sectional shape with an inner surface gradually extending radially outwardly as extending from the intermediate portion to the distal end portion thereof. The restricting projection arranged as described above makes it possible to prevent or restrict an abutting contact of the generally tapered elastic body with the restricting projection, while effectively restricting the annular region defining the fluid passage within the pressure-receiving chamber upon application of vibrations thereto in the radial directions.

(3) A fluid-filled elastic mount according to the above indicated mode (1) or (2), wherein the restricting projection includes a cutout formed in at least one circumferential position thereof. According to this mode of the invention, the spring stiffness of the restricting projection can be made lower owing to the presence of the cutout, thereby allowing the restricting projection to be able to sufficiently restrict the annular region, while facilitating its elastic deformation. Thus, the fluid-filled elastic mount according to this mode of the invention is capable of minimizing a tendency for its dynamic spring constant to considerable increase when being subjected to vibrational loads applied thereto in the radial directions in a yet further effective manner, with the help of the elastic deformation of the restricting projection.

The number and the shape of the cutout are not particularly limited, but may be suitably determined while taking into account its required spring characteristics of the restricting projection. A variety of examples of the cutout include: a circumferentially extending crack-like cutout having a substantially no width; a cutout dividing the restricting projection into at least two parts in the circumferential direction; a cutout extending from the distal end of the restricting projection with a length or depth not to reach the proximal end of the restricting projection; and a substantial cutout formed by partially reducing the wall-thickness of the restricting projection by a sufficient amount.

(4) A fluid-filled elastic mount according to any one of the above-indicated modes (1)–(3), wherein the partition member includes a through hole formed through a central portion thereof and fluid-tightly closed by a movable rubber layer disposed therein such that fluid pressures in the pressure-receiving chamber and the equilibrium chamber act on opposite surfaces of the movable rubber layer, respectively, the movable rubber layer being formed integrally with the restricting projection. According to this mode of the invention, the movable rubber layer is employed for reducing or absorbing the fluid pressure variation in the pressure-receiving chamber so as to prevent the dynamic spring constant from increasing upon application of vibrations over a higher frequency range in which a resistance to flow of the fluid through the orifice passage is too high to permit the flow of the fluid therethrough, and the restricting projection can be formed integrally with the movable rubber layer in an easy and effective manner. Thus, the fluid-filled elastic mount constructed according to this mode of the invention can be manufactured with improved efficiency and with simple structure.

(5) A fluid-filled elastic mount according to any one of the above-indicated modes (1)–(4), wherein the partition member includes a cylindrical stepped portion formed at a radially intermediate portion thereof so as to extend continuously in a circumferential direction thereof, and the restricting projection bonded to an inner circumferential portion of the partition member located radially inward of the cylindrical stepped portion, in a process of vulcanization of a rubber material for forming the restricting projection, and an outer circumferential portion of the partition member located radially outward of the cylindrical stepped portion is fixed by caulking to the upper open-end portion of the cylindrical portion of the second mounting member. According to this arrangement, the inner circumferential portion of the partition member to which the restricting projection is bonded by the vulcanization can be spaced away from the outer circumferential portion of the partition member, which is used for the caulking, with the cylindrical stepped portion interposed therebetween. This makes it possible to effectively prevent, upon the vulcanization of the rubber material for forming the restricting projection within the mold, that the rubber material undesirably extends to the outer circumferential portion of the partition member to be used for the caulking. This arrangement effectively permits the outer circumferential portion of the partition member to be caulked against the cylindrical portion of the second mounting member with strength and durability as well as stability.

(6) A fluid-filled elastic mount according to any one of the above-indicated modes (1)–(5), further comprising at least one first abutting fin integrally formed with at least one of the generally tapered elastic body and the restricting projection such that the at least one first abutting fin is disposed in a space defined between surfaces of the generally tapered elastic body and the restricting projection, which surfaces are opposed to each other in the axial direction, so as to protrude from at least one of the surfaces of the generally tapered elastic body and the restricting projection toward an other one of the surfaces of the generally tapered elastic body and the restricting projection, for restricting or dividing the space at least one circumferential position of the space. In the fluid-filled elastic mount constructed according to this mode of the invention, the cross sectional area of the space defined between the axially or radially opposite surfaces of the generally tapered elastic body and the restricting projection is further reduced by means of the first abutting fin, and accordingly, the cross sectional area of the fluid passage formed in the annular region of the pressure-receiving chamber is more reduced than that in the fluid-filled elastic mount where the restricting projection with no fin is provided. Thus, the fluid-filled elastic mount is capable of further effectively moderating or eliminating the tendency for its dynamic spring constant to increase when being subjected to vibrations over a higher frequency range applied thereto in the radial directions, which may be caused by anti-resonance motion of the non-compressible fluid upon application of the vibrational load over a higher frequency range.

In this respect, the first abutting fin formed on the surface of at least one of the generally tapered elastic body and the restricting projection has a thin-walled fin shape, so that the first abutting fin is more likely to be elastically deformed when being brought into abutting contact with the surface of the other one of the generally tapered elastic body and the restricting projection. Thus, the first abutting fin may exhibit a shock absorbing effect upon the abutting contact between the restricting projection and the generally tapered elastic body, making it possible to eliminate or reduce abutting noises generated upon the above-indicated abutting contact.

The number and the forming portion of the first abutting fin are not particularly limited, provided at least one of the first abutting fin is formed on the surface of the generally tapered elastic body or the surface of the restricting projection, but may be suitably determined while taking into account a required damping capability, efficiency in manufacturing of the elastic mount and the like. For instance, it is preferable to form a pair of first abutting fins formed on the generally tapered elastic body and the restricting projection so as to be opposed to each other in the generally radial direction, thus permitting a further decrease of the cross sectional area of the pressure-receiving chamber. Alternatively, a plurality of the first abutting fins are formed on the surface of the generally tapered elastic body and/or the restricting projection so as to be spaced away from each other in the circumferential direction, whereby the fluid-filled elastic mount can improve its damping characteristics with respect to vibrations applied thereto in various radial directions, since the cross sectional area of the fluid passage is reduced by the plurality of the first abutting fins.

(7) A fluid-filled elastic mount according to the above-indicated mode (6), wherein the at least one first abutting fin is held in abutting contact with the other one of the surfaces of the generally tapered elastic body and the restricting projection, in a state where the elastic mount is not installed in position and no external load is applied between the first and second mounting members. According to this mode of the invention, the first abutting fin is held in abutting contact with the generally tapered elastic body or the restricting projection in advance, namely, before the installation of the fluid-filled elastic mount in position. This arrangement assures the first abutting fin to restrict or reduce the cross sectional area of the space defined between the axially or radially opposite surfaces of the generally tapered elastic body and the restricting projection, and the fluid passage formed in the annular region of the pressure-receiving chamber, when the elastic mount is installed on a desired vibration system, e.g., an automotive vehicle, and the axial or radial distance between the generally tapered elastic body and the restricting projection is increased due to the elastic deformation of the generally tapered elastic body caused by a static load acting between the first and the second mounting members. Thus, the fluid-filled elastic mount constructed according to this mode of the invention is capable of effectively moderating considerable increase of its dynamic spring constant that may be caused by resonance of the fluid flowing through the annular region.

In particular, since the first abutting fin is a thin-walled fin-shaped member made of the rubber elastic body, when the first and second mounting members are assembled with each other in the axial direction and the abutting fin is brought into abutting contact with the generally tapered elastic body or the restricting projection, the first abutting fin may exhibit a minimized elastic force in a direction opposite to the axial direction in which the first and second mounting member are assembled with each other, thereby ensuring high operation efficiency in assembling the elastic mount.

(8) A fluid-filled elastic mount according to the above-indicated mode (7), wherein the at least one abutting fin is spaced away from the other one of the surfaces of the generally tapered elastic body and the restricting projection, in a state where the generally tapered elastic body is elastically deformed so as to move the first mounting member vertically downwardly relative to the second mounting member due to a static load applied to the first mounting member in a direction of suspension. This arrangement is effective to avoid the deterioration of the damping capability of the elastic mount due to the presence of the restricting projection. Also, this arrangement further facilitates the elastic deformation of the restricting projection when the elastic mount is installed in position, so that the restring projection is more likely to disturb the flows of the fluid through the annular region. Thus, the fluid-filled elastic mount constructed according to this mode of the invention, is capable of effectively moderating or eliminating the tendency for its dynamic spring constant to considerably increase, which may be caused by resonance of the fluid flowing through the annular region, as a result of the above-described disturbance of the fluid as well as the reduced cross sectional area of the fluid passage by the first abutting fin.

(9) A fluid-filled elastic mount according to any one of the above-indicated modes (1)–(8), further comprising at least one second abutting fin integrally formed with at least one of the generally tapered elastic body and the restricting projection such that the at least one second abutting fin is disposed in a space defined between surfaces of the restricting projection and the generally tapered elastic body and/or the first mounting member, which are opposed to each other in the generally radial direction perpendicular to the axial direction, so as to protrude from at least one of the surfaces toward an other one of the surfaces, for restricting or dividing the space at least one circumferential positions of the space. According to this mode of the invention, the annular region defining the fluid passage is effectively restricted in its cross section, permitting the elastic mount to exhibit the same effects explained above with respect to the elastic mount constructed according to the above-indicated mode (6)–(8) of the invention, in which the first abutting fin is provided. The elastic mount is accordingly capable of effectively moderating or eliminating considerable increase of its dynamic spring constant due to the higher frequency vibrations applied thereto in the radial directions, in a further effective manner. Moreover, the second abutting fin is a thin-walled fin-shaped member made of the rubber elastic body, the second abutting fin may exhibit a shock absorbing effect when being brought into abutting contact with the restricting projection or the generally tapered elastic body upon application of vibrations to the elastic mount in the radial directions, making it possible to eliminate or reduce abutting noises generated upon the above-indicated abutting contact, and to eliminate a possible adverse effects of the second abutting fin on the generally tapered elastic body and the restricting projection. Preferably, the second abutting fin may be employed in combination with the first abutting fin employed in the elastic mount according to any one of the above-indicated modes (6)–(8). In this case, the elastic mount can improve its damping capability with further improved manner.

(10) A fluid-filled elastic mount according to any one of the above-indicated modes (1)–(9), wherein the flexible layer bonded at a peripheral portion thereof to an annular fixing metallic member, and the annular fixing member is superposed at a peripheral portion on a peripheral portion of the partition member and fixed by caulking to the vertically upper open-end portion of the cylindrical portion of the second mounting member together with the partition member. In the fluid-filled elastic mount constructed according to this mode of the invention, the vertically upper open-end portion of the cylindrical portion of the second mounting member can be fluid-tightly closed by the flexible layer, while effectively utilizing a structure for caulking the partition member to the cylindrical portion of the second mounting member.

(11) A fluid-filled elastic mount according to the above-indicated mode (10), wherein the annular fixing metallic member and the partition member cooperate to at least partially define therebetween the orifice passage so as to extend circumferentially at an outer circumferential portion of the partition member. This arrangement makes it possible to easily form the orifice passage with a sufficient length, without sophisticating the structure of the partition member itself. For instance, the partition member may be formed of a single metallic plate, and at least one of the partition member and the annular fixing metallic member is bended so that the partition member and the annular fixing metallic member cooperate to define therebetween a circumferentially extending gap, namely the orifice passage. While the orifice passage is open at one of opposite ends thereof to the pressure-receiving chamber, and at the other end to the equilibrium chamber, the open end of the orifice passage to the pressure-receiving chamber may be formed by a cutout portion formed in the restricting projection, which may provide the cutout of the elastic mount constructed according to the above-indicated mode (3) of the invention.

(12) A fluid-filled elastic mount according to the above-indicated modes (1)–(11), wherein a wall thickness of the generally tapered elastic body varies in a circumferential direction thereof so that the generally tapered elastic body includes a pair of thick-walled portions opposed to each other in a first diametric direction with the first mounting member interposed therebetween and a pair of thin-walled portions opposed to each other in a second diametric direction with the first mounting member interposed therebetween, the first and second diametric directions are orthogonal with each other. According to this mode of the invention, the spring characteristics of the elastic mount on the basis of the generally tapered elastic body, can be softened at a diametric direction in which a pair of thin-walled portions are opposed to each other Thus, the fluid-filled elastic mount is able to exhibit a lower dynamic spring constant in the radial or diametric direction, with the help of the thin-walled portions as well as the effects of the restricting projection.

BRIEF DESCRIPTION OF THE DRAWINGS

The forgoing and/or other objects features and advantages of the invention will become more apparent from the following description of preferred embodiments with reference to the accompanying drawings in which like reference numerals designate like elements and wherein.

DETAILED DESCRIPTION OF PREFERRED EMBODIMENTS

Figure 1:
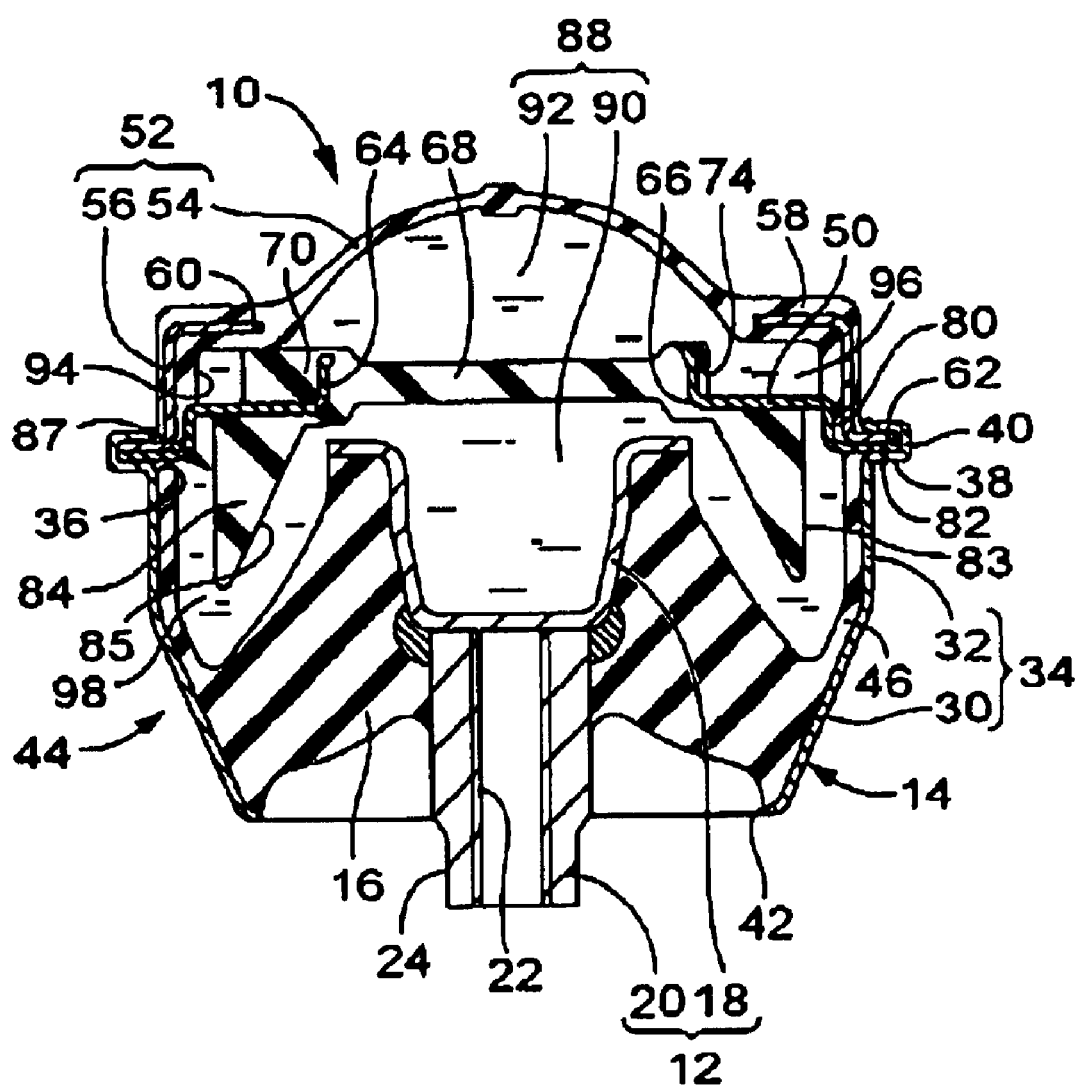
FIG. 1 is an elevational view in axial or vertical cross section of an engine mount for use in an automotive vehicle, which is constructed according to a first embodiment of a fluid-filled elastic mount of the invention.

Referring first to FIG. 1, an engine mount 10 for an automotive vehicle is shown as one embodiment of the fluid-filled elastic mount of the present invention. This engine mount 10 includes an inner shaft member 12 as a first mounting member and an outer cylindrical member 14 as a second mounting member, which members 12, 14 are both made of metallic materials and are opposed to each other with a radial spacing therebetween. The inner shaft member 12 and the outer cylindrical member 14 are elastically connected to each other by an elastic body 16 interposed therebetween. The engine mount 10 is installed on the vehicle such that the inner shaft member 12 is attached to a power unit of the vehicle (not shown), while the outer cylindrical member 14 is attached to a body of the vehicle (not shown), so that the power unit is suspended from the body in a vibration-damping or isolating manner. When the engine mount 10 is installed on the vehicle as described above, the weight of the power unit acts on the engine mount 10 in the vertical direction as seen in FIG. 1. This static load causes a certain amount of elastic deformation of the elastic body 16 so that the inner shaft member 12 is displaced by a suitable amount relative to the outer cylindrical member 14 in the vertically downward direction. The engine mount 10 receives a vibrational load primarily in the substantially vertical direction as seen in FIG. 1.

More specifically, the inner shaft member 12 includes a metallic cup member 18 having a generally cylindrical cup shape, and a metallic tube member 20 having a generally cylindrical shape, which is fixed to a bottom surface of the cup shaped member 18 by welding. The metallic tube member 20 has a threaded central bore that serves as a tapped hole 22, and a two-flats portion 24 formed at its lower end portion Referring to FIG. 9, a mounting bolt 26 is screwed into the tapped hole 22 of the inner shaft member 12 so that the inner shaft member 12 is fixedly attached to a bracket 28 fixed to the power unit (not shown)

The outer cylindrical member 14 is a large-diameter thin-walled generally hollow cylindrical member whose diameter is made sufficiently larger than an outer diameter of the inner shaft member 12 The outer cylindrical member 14 includes at its axially lower end portion a tapered cylindrical portion 30 whose diameter gradually decreases in the axially outward or downward direction, and at its axially upper end portion a large-diameter cylindrical portion 32 whose inner and outer diameters are made constant over its entire axial length. In the present embodiment, the tapered cylindrical portion 30 and the large-diameter cylindrical portion 32 cooperate to each other to provide a vertically extending cylindrical portion 34 of the outer cylindrical portion 14. A shoulder 38 is integrally formed at an open-end portion of the large-diameter cylindrical portion 32 of the outer cylindrical portion 14, i.e., an axially upper open-end portion 36 of the cylindrical portion 34, so as to extend radially outwardly. An outer peripheral portion of the shoulder 38 serves as an integrally formed caulking part 40 that extends axially upwardly as seen in FIG. 1.

The thus formed outer cylindrical member 14 is disposed radially outwardly of the inner shaft member 12 in approximately coaxial or concentric relationship with each other, with a given radial spacing therebetween, such that the inner shaft member 12 is inserted into and disposed within the tapered cylindrical portion 30 or a lower open-end portion 42 of the cylindrical portion 34 with its axially lower end portion being protruded axially outwardly or downwardly from the lower open-end portion 42 of the cylindrical portion 34 of the outer cylindrical member 14.

Figure 2:
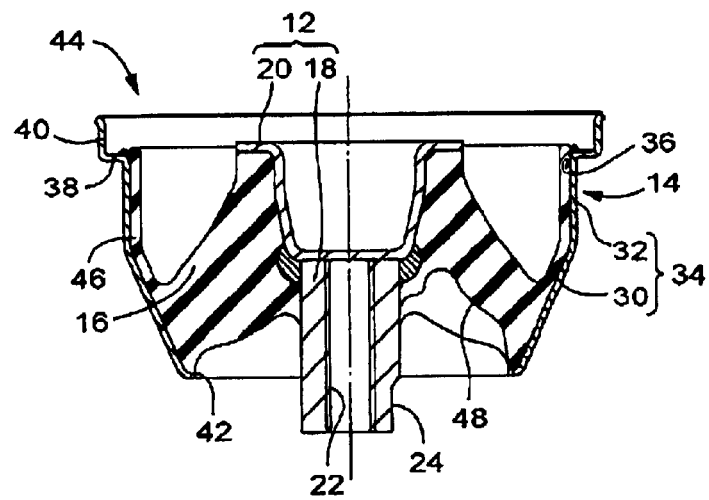
FIG. 2 is an elevational view in axial or vertical cross section of a first integrally vulcanized assembly of the engine mount of FIG. 1, which is taken along line 2—2 of FIG. 3.

The elastic body 16 is interposed between the inner shaft member 12 and the outer cylindrical member 14 disposed relative to each other as described above. This elastic body 16 is a generally tapered thick-walled cylindrical member with a tapered profile whose diameter is gradually increased in the axially downward direction as seen in FIG. 1. The elastic body 16 is bonded at an inner circumferential surface of its small diameter end portion to an outer circumferential surface of the inner shaft member 12, and an outer circumferential surface of its large diameter end portion to an inner circumferential surface of the outer cylindrical member 14, when a rubber material is vulcanized to form the elastic body 16, thereby providing a first integrally vulcanized assembly 44 as shown in FIG. 2, in which the inner shaft member 12 and the outer cylindrical member 14 are bonded together via the elastic body 16. In the first integrally vulcanized assembly 44, the lower open-end portion 42 of the cylindrical portion 34 of the outer cylindrical member 14 is fluid-tightly closed by the elastic body 16 and the inner shaft member 12.

A generally cylindrical rubber coating layer 46 is integrally formed at an outer peripheral portion of the elastic body 16, and is bonded to and coats a generally entire area of an inner circumferential surface of the cylindrical portion 34 upon vulcanization of a rubber material for forming the rubber coating layer 46

The elastic body 16 or the first integrally vulcanized assembly 44 is further formed with a pair of pocket-like recesses 48, 48 open in its lower end face at respective circumferential portions which are opposed to each other in a diametric direction of the inner shaft member 12 with the inner shaft member 12 interposed therebetween. As is apparent from FIG. 3, each of the recesses 48, 48 has a generally sector shape with a circumferential length of about ¼ of a circumference of the elastic body 16.

Figure 3:
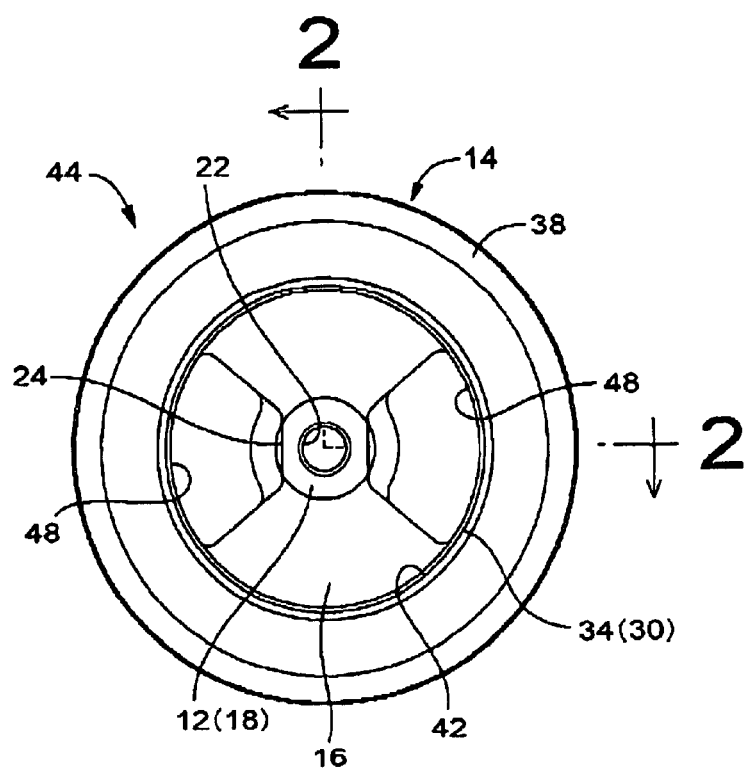
FIG. 3 is a bottom plane view of the first integrally vulcanized assembly of FIG. 2.

According to the present embodiment, the diametric direction of the inner shaft member 12 in which the pair of recesses 48, 48 are opposed to each other, is approximately aligned to a longitudinal or a driving direction of the vehicle, which is made approximately equal to the horizontal direction as seen in FIG. 3. Therefore, the spring stiffness of the elastic body 16 is made lower (softer) in the longitudinal direction of the vehicle, rather than the horizontal direction of the vehicle. The presence of the pair of recesses 48, 48 makes it possible to vary the wall thickness dimension of the elastic body 16 in the circumferential direction. Namely, the elastic body 16 includes thin walled portions where the pair of recesses 48, 48 are formed, and thick walled portions where no recess is formed.

Referring back to FIG. 1, a metallic partition member 50 and a lid member 52 are superposed in this order on the upper open-end portion 36 of the cylindrical portion 34 of the outer cylindrical member 14.

Figure 4:
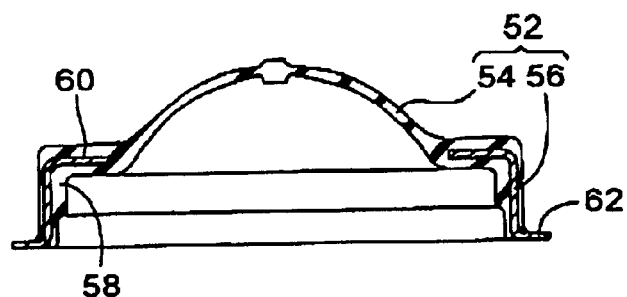
FIG. 4 is an axial or vertical cross sectional view of a lid member of the engine mount of FIG. 1.
Figure 5:
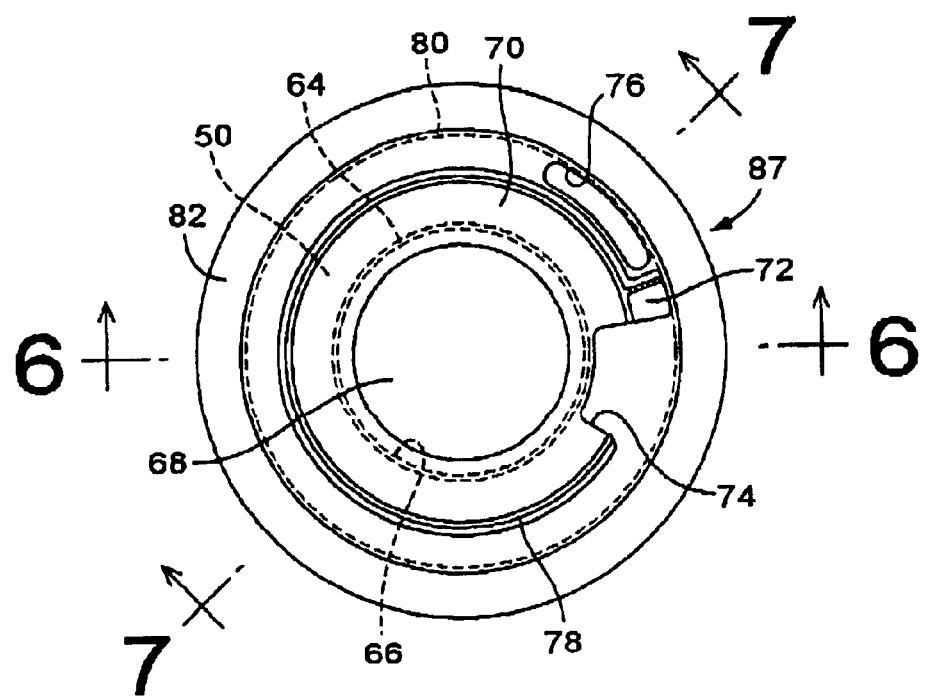
FIG. 5 is a top plane view of a second integrally vulcanized assembly of the engine mount of FIG. 1.

As shown in FIG. 4, the lid member 52 includes a flexible layer in the form of a flexible diaphragm 54 and an annular fixing metallic member in the form of a metallic lid 56. The flexible diaphragm 54 is formed of an easily deformable thin-walled rubber elastic layer with a thin-walled dome-like configuration in its entirety, and open to the axially lower part of the engine mount 10. A generally annular sealing rubber layer 58 is integrally formed at an open-end peripheral portion (outer circumferential edges portion) of the diaphragm 54. The metallic lid 56 is a generally large-diameter cylindrical member formed of metal by pressing, and includes an annular top-wall portion 60 integrally formed at its axially upper end portion so as to extend radially inwardly to have a generally annular shape, and an outward flange portion 62 integrally formed at its axially lower end portion so as to extend radially outwardly. A generally entire portion of the metallic lid 56, except the outward flange portion 62, is coated by the sealing rubber layer 58. Thus, the flexible diaphragm 54 and the metallic lid 56 cooperate to form the lid member 52 as an integrally vulcanized assembly.

Figure 6:
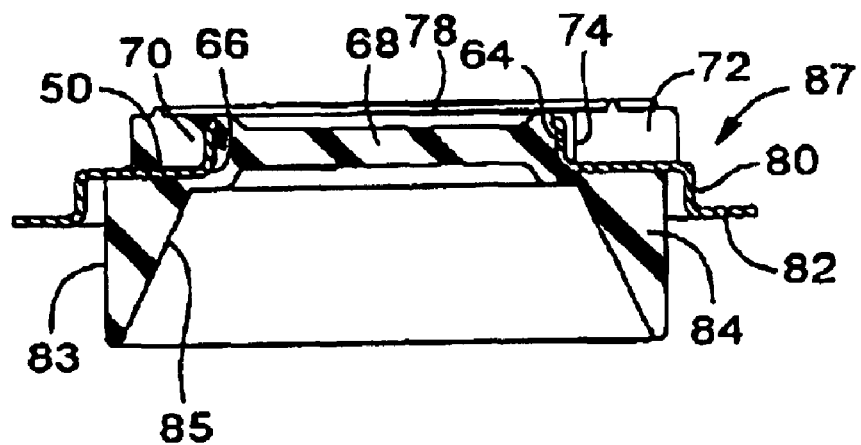
FIG. 6 is a cross sectional view taken along line 6—6 of FIG. 5.
Figure 7:
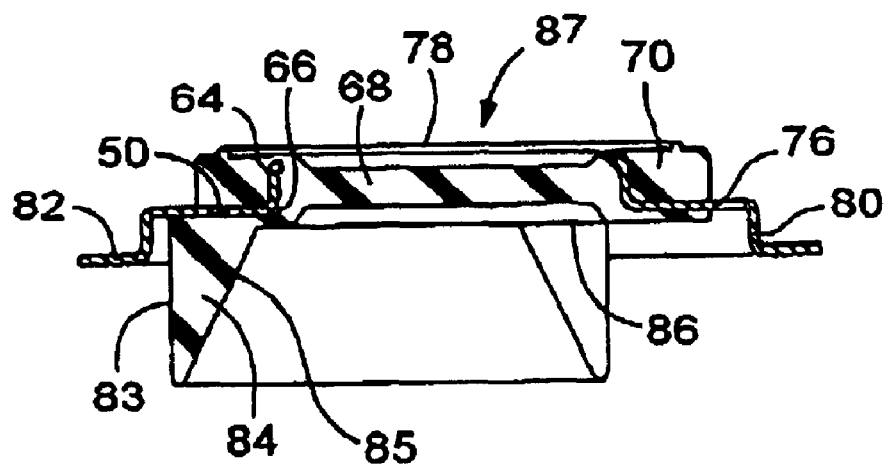
FIG. 7 is a cross sectional view taken along line 7—7 of FIG. 5.

Referring next to FIGS. 5–8 showing the metallic partition member 50, the metallic partition member 50 is a generally annular member formed of metal by pressing, and defines a through hole 66 in its central portion. The metallic partition member 50 includes a cylindrical wall portion 64 integrally formed at a peripheral portion of the through hole 66 so as to extend axially upwardly as seen in FIGS. 6 and 7. In order to close the through hole 66, a movable rubber layer in the form of an elastic rubber plate 68 is disposed in the through hole 66 so as to extend radially outwardly. The elastic rubber plate 68 is a Generally disk-like member with a generally constant wall thickness entirely, and is bonded at its peripheral portion to the cylindrical wall portion 64 of the metallic partition member 50 with the cylindrical wall portion 64 embedded within the peripheral portion of the elastic rubber plate 68, when a rubber material is vulcanized for forming the elastic rubber plate 68 As is apparent from FIG. 5, a rubber support 70 having a generally annular block-like shape is bonded on an upper surface of the metallic partition member 50 in the process of vulcanization of a rubber material for forming the rubber support 70. The rubber support 70 extends over a generally entire circumference around the through hole 66 with a given width dimension extending from an inner peripheral portion to a radially intermediate portion of the upper surface of the metallic partition member 50. One circumferential portion of the rubber support 70 protrudes radially outwardly to around an outer peripheral portion of the metallic partition member 50, so as to form an elastic partition wall 72 as an integral part. On one of circumferentially opposite sides of the elastic partition wall 72, the wall-thickness of the rubber support 70 is reduced over a predetermined circumferential distance so as to provide a communication groove 74 having a generally rectangular groove shape and extending radially inwardly with a given width. Thus, the rubber support 70 is substantially partially eliminated or cut-off on the one side of the elastic partition wall 72 to provide the communication groove 74. On the other side of the elastic partition wall 72, there is formed a communication hole 76 extending through the metallic partition member 50 in the thickness direction. A sealing lip 78 may be integrally formed on the upper surfaces of the rubber support 70 and the elastic partition wall 72, as needed The metallic partition member 50 is further arranged to have a cylindrical stepped portion 80 and a flange portion 82 at its outer circumferential portion. The cylindrical stepped portion 80 is located radially outward of the rubber support 70, and continuously extends in the circumferential direction of the metallic partition member 50. The flange portion 82 is integrally formed at an open-end peripheral portion of the cylindrical stepped portion 80 so as to extend radially outwardly.

On a lower surface of the metallic partition member 50, a restricting projection 84 formed of a rubber elastic body is bonded in the process of vulcanization of a rubber material for forming the restricting projection 84 so as to extend axially downwardly. As shown in FIGS. 6 and 7, the restricting projection 84 has an outer circumferential surface 83 extending straightly in the axially downward direction with an approximately constant diameter over an entire axial length, and an inner circumferential surface 85 extending axially downwardly with a diameter gradually increasing in the axially downward direction to be shaped as a tapered cylindrical surface. Namely, the restricting projection 84 extends circumferentially with a tapered cross section in which a height or lengthwise dimension is made larger than a width dimension at its proximal portion. In the present embodiment, the restricting projection 84 is bonded by the above-indicated vulcanization process to a radially intermediate portion of the lower surface of the metallic partition member 50 so as to be located radially inward of the cylindrical stepped portion 80, and so as to be radially inwardly spaced away from the cylindrical stepped portion 80.

Figure 8:
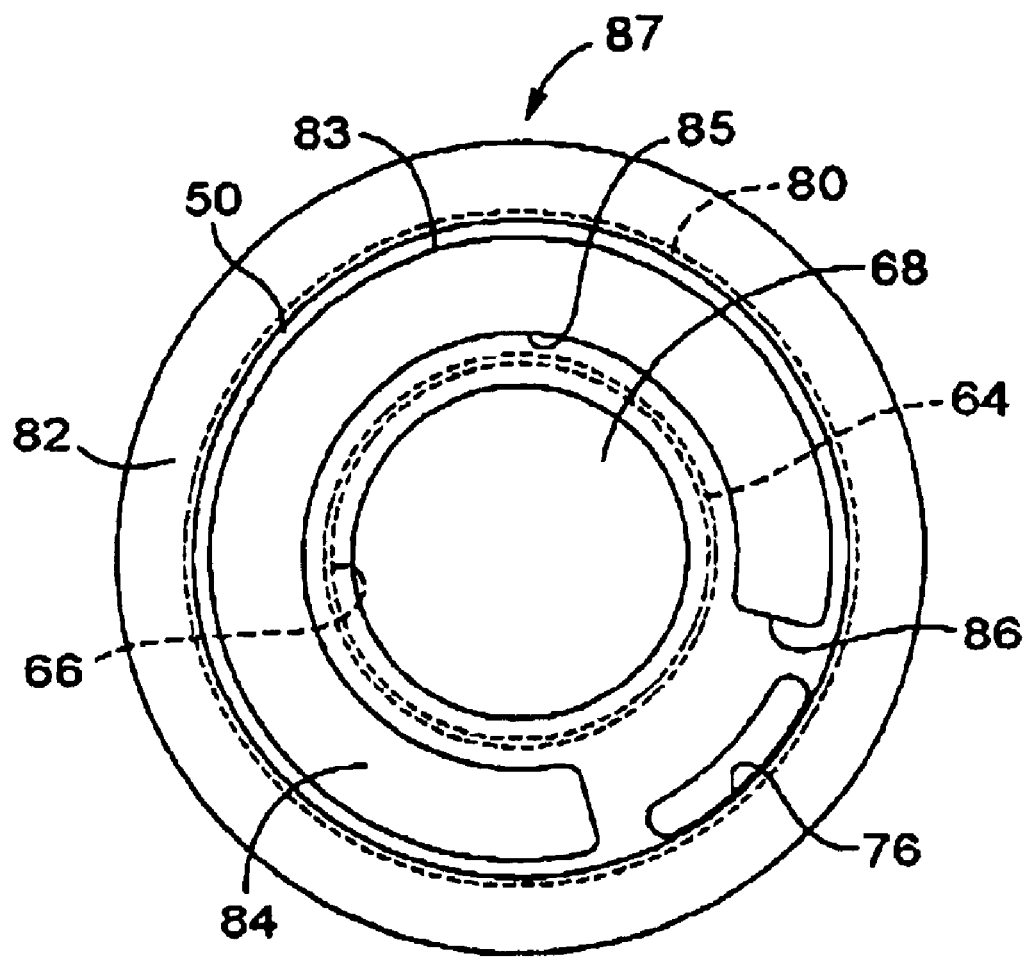
FIG. 8 is a bottom plane view of the second integrally vulcanized assembly of FIG. 5.

The restricting projection 84 is partially cutout at one circumferential position, as shown in FIG. 8, thereby forming a cutout portion 86 extending in the radial direction for dividing the restricting projection 84. The cutout portion 86 is open to the communication hole 76 of the metallic partition member 50, which is located radially outward of the restricting projection 84. In this arrangement, a radially inner side of the restricting projection 84 is open in the upper surface of the partition member 50 through the cutout portion 86 and the communication hole 76.

These elastic rubber plate 68, the restricting projection 84, the elastic partition wall 72 and the rubber support 70 are integrally formed with each other and bonded to the metallic partition member 50 upon vulcanizing a rubber material for forming these parts 68, 84, 72, 70 into an integral rubber elastic body. That is, the elastic rubber plate 68, the restricting projection 84, the elastic partition wall 72 and the rubber support 70 as well as the metallic partition member 50 cooperate to form a second integrally vulcanized assembly 87.

Referring back to FIG. 1, the metallic partition member 50 and the lid member 52 superposed on the metallic partition member 50 in the axial direction, are assembled to the upper open-end portion 36 of the cylindrical portion 34 of the outer cylindrical member 14 such that the flange portion 82 of the metallic partition member 50 and the outward flange portion 62 of the lid member 52 are laminated on the shoulder portion 38 of the outer cylindrical member 14, and are firmly fixed to the outer cylindrical member 14 by caulking the caulking portion 40 on these flange portions 82 and 62.

With the metallic partition member 50 and the lid member 52 firmly fixed to the outer cylindrical member 14 by caulking as described above, the upper open-end portion 36 of the outer cylindrical member 14 is fluid-tightly closed by these two members 50, 52. In the thus constructed engine mount 10, the elastic body 16 and the flexible diaphragm 54 cooperate with the outer cylindrical member 14 to define therebetween a fluid chamber 88 filled with a suitable non-compressible fluid. Also, the metallic partition member 50 is disposed within the fluid chamber 88 so as to extend in the radial direction perpendicular to the axial direction of the engine mount 10. Thus, the partition member 50 divides the fluid chamber 88 into two sections on the axially opposite sides thereof, namely, a pressure-receiving chamber 90 partially defined by the elastic body 16 and located on the axially lower side wherein the inner shaft member 12 is disposed, and an equilibrium chamber 92 partially defined by the flexible diaphragm 54 and located on the axially upper side wherein the lid member 52 is disposed. Upon application of the vibration between the inner shaft member 12 and the outer cylindrical member 14, the pressure of the fluid in the pressure-receiving chamber 90 varies due to elastic deformation of the elastic body 16, while the volume of the equilibrium chamber 92 is permitted to vary by elastic deformation of the flexible diaphragm 54.

The filling of the fluid chamber 88 with the non-compressible fluid is advantageously conducted by assembling the metallic partition member 50 (i.e., the second integrally vulcanized assembly 87) and the lid member 52 with respect to the first integrally vulcanized assembly 44, in a mass of the selected non-compressible fluid. The non-compressible fluid filling the fluid chamber 88 may be preferably selected from among water, alkylene glycol, polyalkylene glycol and silicone oil, for instance. In order to obtain an excellent vibration-damping effect based on resonance of the fluid, the fluid may preferably have a low viscosity of not more than 0.1 Pa·s.

With the metallic partition member 50 and the lid member 52 assembled with each other as described above, an inner circumferential surface of the annular top-wall portion 60 of the lid member 56 is forcedly fitted onto an outer peripheral portion of the rubber support 70 formed on the metallic partition member 50 via the sealing rubber layer 58 interposed therebetween. Thus, the rubber support 70 and the lid member 56 are opposed to each other in the radial direction of the engine mount 10 with a given spacing therebetween, while the metallic partition member 50 and the annular top-wall portion 60 are opposed to each other in the axial direction of the engine mount 10 with a given spacing therebetween, thereby cooperating to each other to define therebetween a circumferential groove 94 extending in their circumferential direction. In one circumferential position of the circumferential groove 94, the elastic partition wall 72 formed on the metallic partition wall 50 is held in close contact at its side wall surface with the sealing rubber layer 58 formed on the lid member 56, and at its upper surface with the sealing rubber layer 58 formed on the annular top-wall portion 60 of the lid member 56. Therefore, the circumferential groove 94 is intercepted at one circumferential position by means of the elastic partition wall 72. On the opposite sides of the elastic partition wall 72, there are suitably positioned the communication hole 76 and a communication groove 74, respectively, so that the circumferential groove 94 communicates at one of circumferentially opposite ends thereof with the pressure-receiving chamber 90 through the communication hole 76 and at the other end with the equilibrium chamber 92 through the communication groove 74. Consequently, the metallic partition member 50, the metallic lid 56 (i.e, the lid member 52) cooperate to form an orifice passage 96 for fluid communication between the pressure-receiving chamber 90 and the equilibrium chamber 92, which is formed at the outer peripheral portion of the metallic partition member 50 so as to extend in the circumferential direction of the metallic partition member 50 with a circumferential length which is slightly smaller than the circumference of the metallic partition member 50.

In the present embodiment, the restricting projection 84 bonded to the metallic partition member 50 is disposed in an annular region 98 of the pressure-receiving chamber 90, which region 98 is defined by and between the elastic body 16 and the cylindrical portion 34 of the outer cylindrical member 14, and extends circumferentially. The restricting projection 84 is spaced away from the elastic body 16 in the axial direction, while the inner and outer circumferential surfaces 85, 83 of the restricting projection 84 are spaced away from the outer circumferential surface of the elastic body 16 and the inner circumferential surface of the cylindrical portion 34 (i.e., the rubber coating layer 46) in the radial direction, respectively, as well. Namely, the inner and outer circumferential surfaces 85, 83 of the restricting projection 84 are entirely spaced away from the inner surface of the pressure-receiving chamber 90. In this state, the restricting projection 84 is disposed within the annular region 98 of the pressure-receiving chamber 90 in a elastically deformable manner, while restricting or reducing a cross sectional area of the annular region 98 of the pressure-receiving chamber 90.

Figure 9:
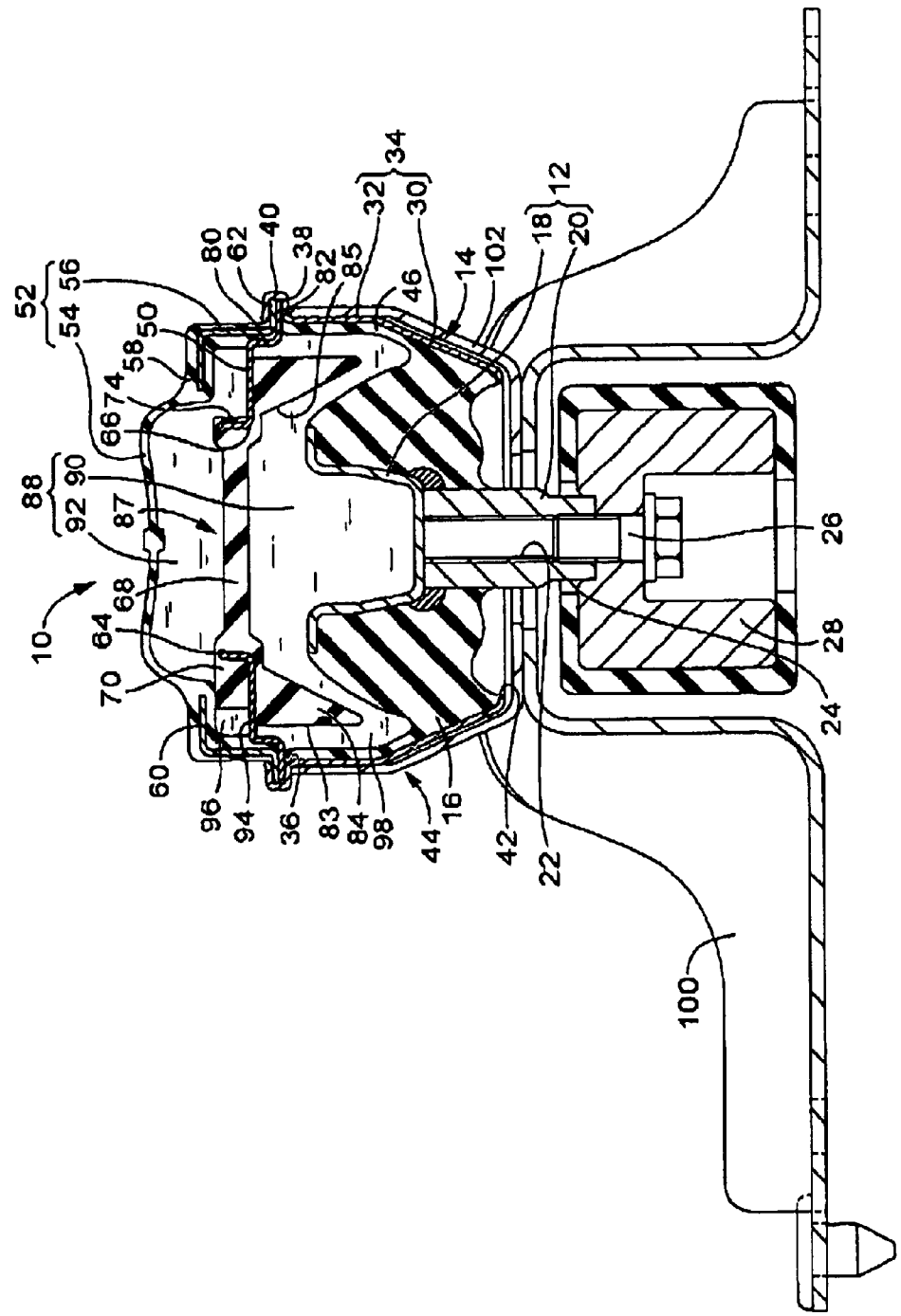
FIG. 9 is an elevational view in axial or vertical cross section of the engine mount of FIG. 1 in a state where the engine mount is installed on an automotive vehicle.

The thus constructed engine mount 10 is installed on the automotive vehicle as illustrated in FIG. 9. Namely, the inner shaft member 12 is firmly attached by means of the mounting bolt 26 screwed into its tapped hole 22 to the bracket 28 fixed to the power unit (not shown) of the vehicle, whereby the inner shaft member 12 is attached to the power unit via the bracket 28. On the other hand, the outer cylindrical member 14 is firmly attached to a bracket 100 that is fixed to the body of the vehicle (not shown), while being press-fitted into a metallic holder 102 some-what larger than the cylindrical portion 34 thereof, whereby the outer cylindrical member 14 is attached to the body of the vehicle via the bracket 100. With the engine mount 10 installed in position as shown in FIG. 9, the elastic body 16 is elastically deformed due to the weight of the power unit acting thereon, so that the inner shaft member 12 is axially downwardly displaced by a given amount relative to the outer cylindrical member 14 Thus, the engine mount 10 is constructed and oriented on the automotive vehicle such that a vibrational load acts on the inner shaft member 12 and the outer cylindrical member 14 primarily in the vertical direction as seen in FIG. 9, thus suspending and supporting the power unit from and to the body of the vehicle in a vibration-damping fashion.

When a vibrational load is primarily applied to the engine mount 10 in the vertical direction, a relative fluid pressure difference is induced between the pressure-receiving chamber 90 and the equilibrium chamber 92, thereby causing flows of the fluid through the orifice passage 96 between the both chambers 90, 92. Thus, the engine mount 10 can exhibit an excellent damping effect based on resonance of the fluid flowing through the orifice passage 96.

When a vibrational load is applied to the engine mount 10 in the radial direction perpendicular to the axial direction, on the other hand, the fluid within the pressure-receiving chamber 90 may be forced to flow through a fluid passage formed in the annular region 98. Since a cross sectional area of the fluid passage formed in the annular region 98 is effectively restricted or reduced by the restricting projection 84 disposed in the annular region 98, a resonance frequency of the fluid flowing through the annular region 98 can be reduced or shifted to a frequency range which does not matter in terms of a vibration-damping capability of the engine mount 10. Described more specifically, the engine mount 10 can eliminate or moderate a problem of considerable increase in a dynamic spring constant thereof at a specific frequency range, e.g., a frequency range corresponding to acceleration noises of the vehicle or the like.

According to the present embodiment, furthermore, the outer and inner circumferential surfaces 83, 85 of the restricting projection 84 are respectively spaced away from the elastic body 16 and the cylindrical wall portion 34 which cooperate to define the pressure-receiving chamber 90, while the restricting projection 84 is formed with the cutout portion 86, as described above. In this arrangement, when flows of the fluid are induced in the annular region 98 of the pressure-receiving chamber 90, the restricting projection 84 is likely to be elastically deformed due to the pressure of the flowing fluid, thus facilitating disturbance of the flows of the fluid. In addition, the provision of the cutout portion 86 effectively reduces spring stiffness of the restriction projections 84. Namely, the restricting projection 84 of the present engine mount 10 makes it possible to restrict the cross section of the annular region 98 with a sufficient effect, while being easily elastically deformable. Thus, the engine mount 10 is able to effectively prevent a significant increase of its dynamic spring constant upon application of the vibrational load in the radial direction, which may be possibly based on the elastic deformation of the restricting projection 84.

Moreover, the restricting projection 84 is independent of the elastic body 16 and fixed to the metallic partition member 50, so as not to interfere with the elastic body 16. This arrangement ensures the engine mount 10 not to be adversely influenced or deteriorated in terms of its essential damping characteristics based on the elastic body 16 by the provision of the restricting projection 84, and ensures an improved efficiency in assembling components of the engine mount 10.

Also, the restricting projection 84 has the tapered shape in cross section with the height dimension that is made larger than the width dimension of its proximal end portion, further facilitating elastic deformation of the restricting projection 84, making it possible to restrict or minimize an amount of increase of the dynamic spring constant, which may be possibly caused by resonance effect of the fluid flowing through the annular region 98

In the present embodiment, the elastic rubber plate 68 bonded to the metallic partition member 50 is disposed between the pressure-receiving chamber 90 and the equilibrium chamber 92. When vibrations applied to the engine mount 10 in its axial direction extends over a higher frequency range in which a resistance to flow of the fluid through the orifice passage 96 is too increased to permit the flow of the fluid therethrough, a fluid pressure variation in the pressure-receiving chamber 90 can be reduced or absorbed owing to the elastic deformation of the elastic rubber plate 68, making it possible to prevent the considerable increase of the dynamic spring constant. Thus, the engine mount 10 can exhibit an excellent damping effect with the help of the elastic rubber plate 68. Described more specifically, the orifice passage 96 may be tuned with respect to the low frequency vibrations corresponding to engine shakes so that the engine mount 10 can exhibit high vibration-damping effect based on resonance of the fluid flowing through the orifice passage 96. Also, the elastic rubber plate 68 may be suitably tuned with respect to the high frequency vibrations corresponding to booming noises so that the engine mount 10 can exhibit an excellent vibration isolating effect based on the elastic deformation of the elastic rubber plate 68 so as to absorb the fluid pressure variation in the pressure-receiving chamber 90.

These elastic rubber plate 68 and the restricting projection 84 are integrally formed and bonded to the metallic partition member 50 in the above-described vulcanization process of the rubber material, making it possible to easily form both of the elastic rubber plate 68 and the restricting projection 84. Thus, the engine mount 10 constructed according to the present embodiment can be manufactured with improved efficiency, and can be made simple in construction.

Yet further, the elastic body 16 is formed with the pair of recesses 48, 48 so that the spring characteristics of the elastic body 16 is made smaller in the longitudinal direction of the vehicle in which the recesses 48, 48 are opposed to each other This low spring characteristics of the elastic body 16 in the longitudinal direction of the vehicle cooperate with the lower dynamic spring characteristics of the engine mount 10 due to the restricting projection 84 to ensure the low spring characteristics of the engine mount 10 in the radial direction in a further sufficient manner, There will be next described another preferred embodiment of an engine mount for use in automotive vehicles, in which the second integrally vulcanized assembly may be otherwise embodied in comparison with the illustrated first embodiment. In the following description, the same reference numerals as used in the first embodiment will be used for identifying structurally corresponding elements and portions, of which no detailed description will be provided.

Figure 10:
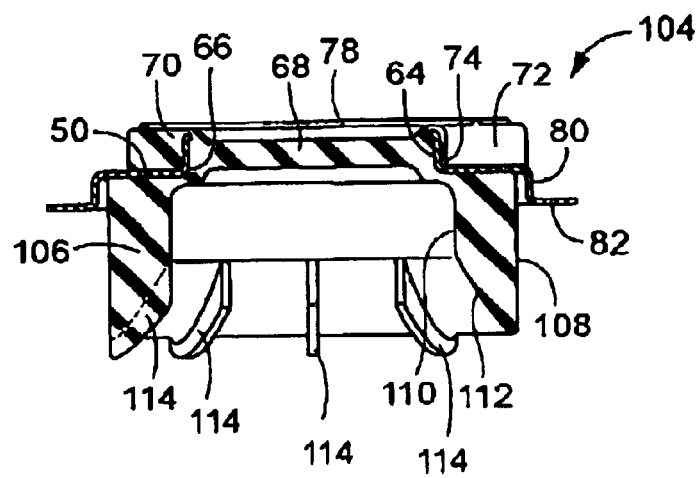
FIG. 10 is an axial or vertical cross sectional view of a second integrally vulcanized assembly of an engine mount constructed according to a second embodiment of a fluid-filled elastic mount of the invention, which is taken along line 10—10 of FIG. 11.
Figure 11:
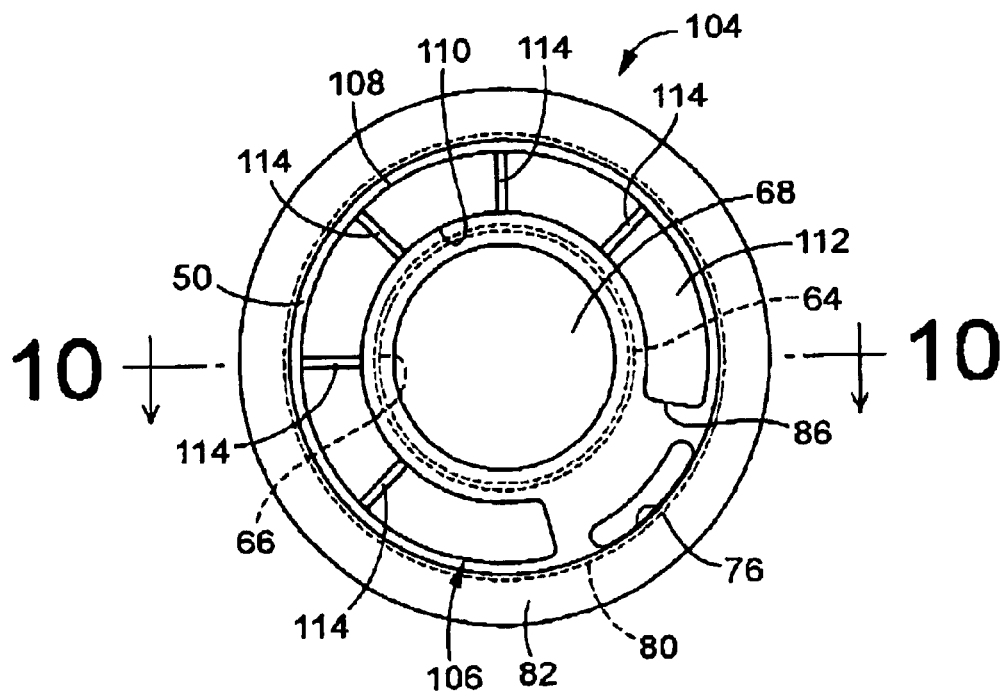
FIG. 11 is a bottom plane view of the second integrally vulcanized assembly of FIG. 10.

Referring next to FIGS. 10 and 11, there is shown a second integrally vulcanized assembly 104 as one component of an engine mount 200 constructed according to a second embodiment of the present invention The second integrally vulcanized assembly 104 is employed instead of the second integrally vulcanized assembly 87 in the engine mount 10 according to the first embodiment. In the second integrally vulcanized assembly 104 a restricting projection 106 has a thick-walled cylindrical shape at its proximal end portion where an inner and an outer circumferential surfaces 110, 108 extend straightly in the axial direction, on the side of the metallic partition member 50 while having tapered shape at its axially lower distal end portion where a tapered inner surface 112 has a diameter that gradually increases in the axially downward directions as seen in FIG. 10.

The restricting projection 106 includes first abutting fins in the form of a plurality of abutting fins 114 formed of a rubber elastic body and integrally formed on respective circumferential positions of the tapered inner surface 112. Each of the abutting fins 114 protrudes straightly from the tapered inner surface 112 of the restricting projection 106 in a direction in which the tapered inner surface 112 is inclined, while having a thin-plate shape with a height dimension and a thickness dimension that are made constant in its entirety. In the present embodiment, as seen in FIG. 11, five abutting fins 114 are formed on the tapered inner surface 112 with a generally constant spacing therebetween, over an approximately half of a circumferential area of the restricting projection 106, except the cutout portion 86.

Figure 12:
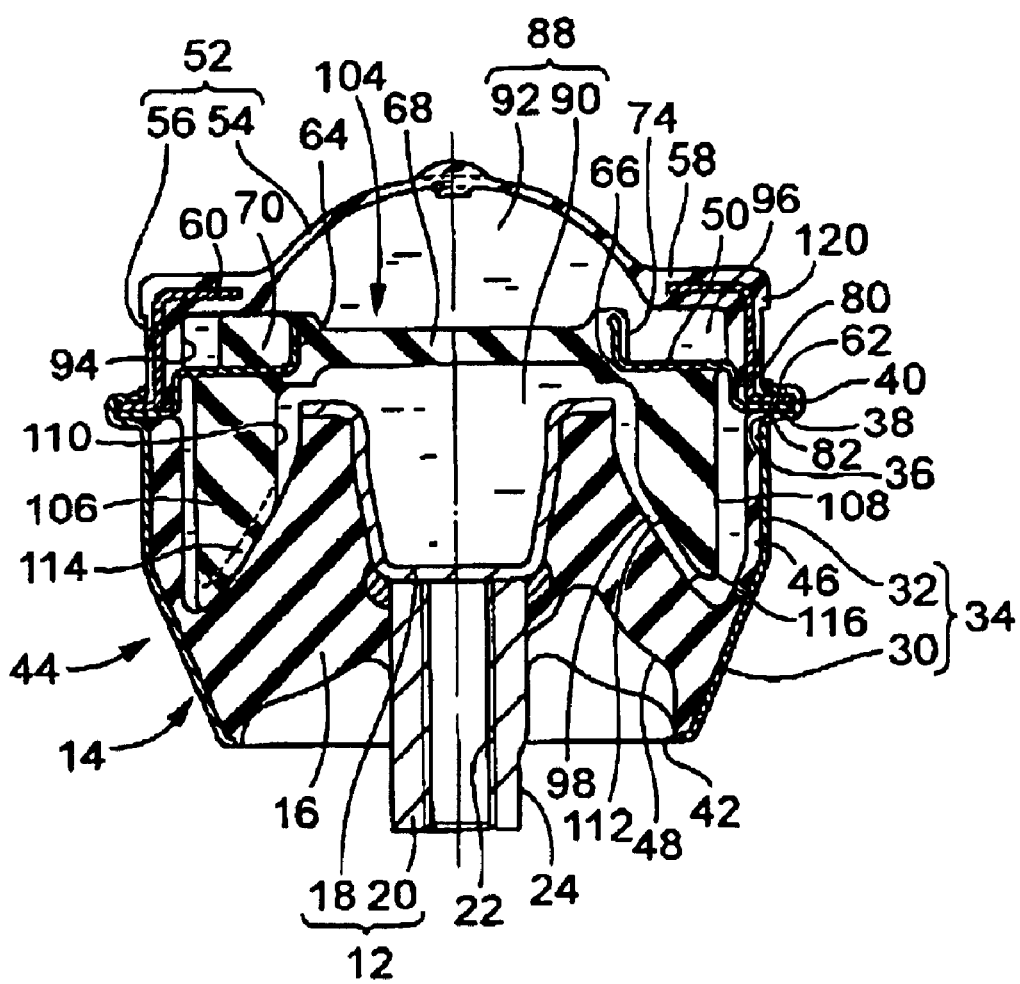
FIG. 12 is an elevational view in axial or vertical cross section of the engine mount of the second embodiment.

As shown in FIG. 12, the second integrally vulcanized assembly 104 in which the restricting projection 106 and the abutting fins 114 are integrally formed, is firmly fixed to the first integrally vulcanized assembly 44 by caulking, as in the first embodiment.

Before installing the engine mount 200 on the vehicle where no external load is applied between the inner shaft member 12 and the outer cylindrical member 14, the protruding end portions of the abutting fins 114 protruding from the tapered inner surface 112 of the restricting projection 106 are forcedly held in abutting contact with a tapered outer circumferential surface 116 of the elastic body 16, and are elastically compressed in the axial direction primarily due to the fixing or caulking force acting between the inner shaft member 12 and the outer cylindrical member 14 in the axial direction.

Figure 13:
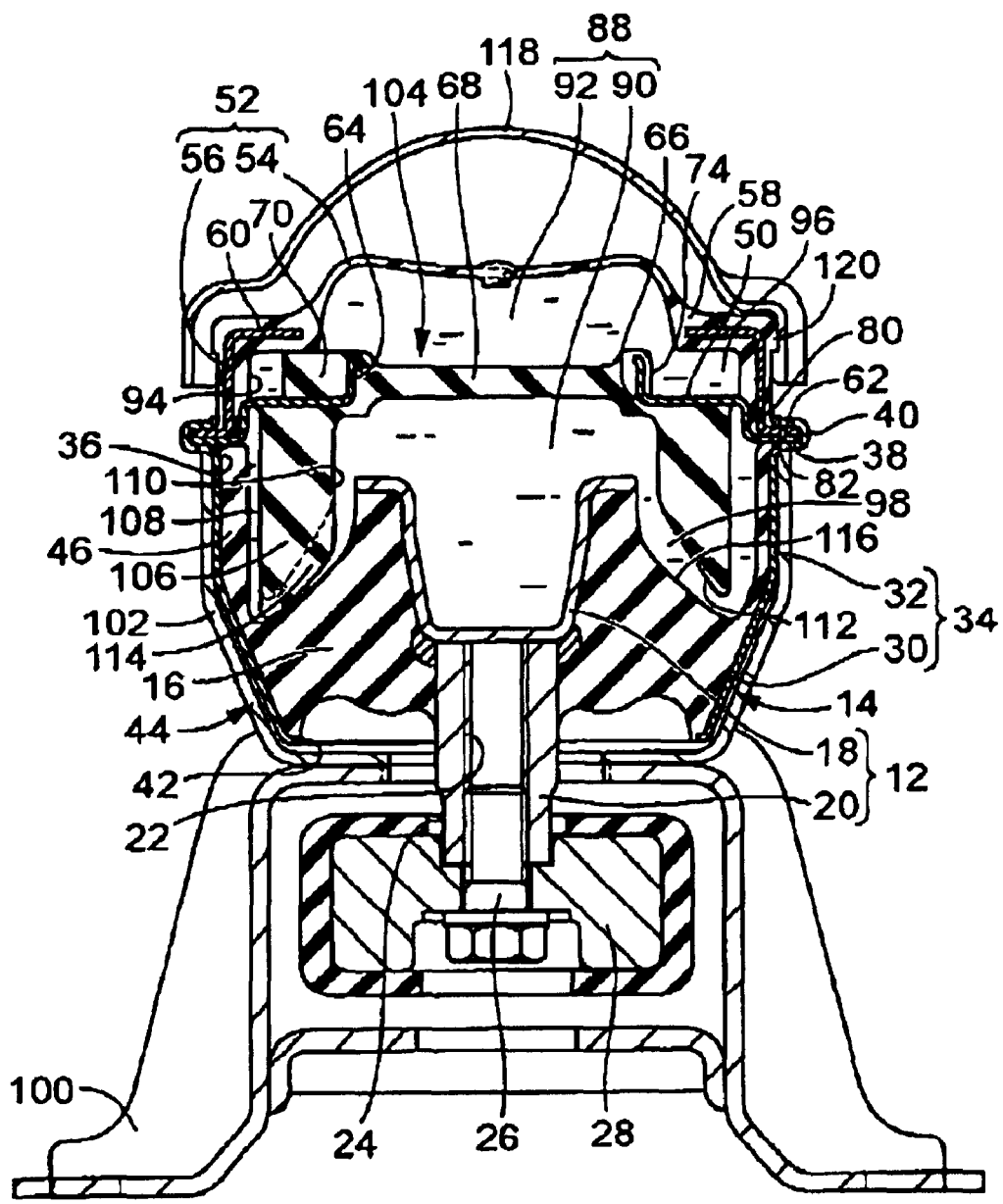
FIG. 13 is an elevational view in axial or vertical cross section of the engine mount of FIG. 12 in a state where the engine mount is installed on the automotive vehicle.

When the engine mount 200 is installed in the vehicle, on the other hand, the weight of the power unit acts on the engine mount 200 in the vertical direction as seen in FIG. 13, thus causing a certain amount of elastic deformation of the elastic member 16 so that the inner shaft member 12 is displaced by a suitable amount relative to the outer cylindrical member 14 in the vertically downward direction. As a result, the abutting fins 114 are spaced away from the tapered outer circumferential surface 116 of the elastic body 16. In this state, the restricting projection 106 including the abutting fins 114 is entirely spaced away from the inner surface of the pressure-receiving chamber 90, permitting the restricting projection 106 to restrict the cross sectional area of the annular region 98 in the pressure-receiving chamber 90, and inhibiting the restricting projection 106 to deteriorate the elastic deformation characteristics of the elastic body 16.

In the present embodiment, a generally dome-shaped protection cover 118 is fixedly engaged with an engaging portion 120 integrally formed on the sealing rubber layer 58, whereby the flexible diaphragm 54 is entirely covered and protected by the protection cover 118.

Like the first embodiment, the engine mount 200 constructed according to the second embodiment is able to effectively prevent a significant increase of its dynamic spring constant upon application of the vibrational load over a higher frequency range in the radial direction, since the cross sectional area of the annular region 98 is effectively restricted by the restricting projection 106

In the present embodiment moreover, the plurality of abutting fins 114 are formed on the protruding end portion of the restricting projection 106, i.e., the tapered inner surface 112, and are forcedly held in contact with the elastic body 16, when the engine mount 200 is not installed on the vehicle. Therefore, when the engine mount 200 is installed in position and the restricting projection 106 is moved away from the elastic body 16 in the axial direction due to the weight of the power unit acting on the mount 200, the cross sectional area of the annular region 98 is more effectively restricted or reduced by the abutting fins 114. Thus, the engine mount 200 is able to reduce its dynamic spring constant in the radial directions due to the effect of the restricted cross sectional area of the annular region 98 by means of the abutting fins 114.

In this respect, since the abutting fins 114 are configured to have a thin-plate shape, the abutting fins 114 are likely to be elastically deformed due to the pressure of the fluid flowing through the annular region 98 functioning as the fluid passage, thus further facilitating disturbance of the flows of the fluid through the annular region 98. It should be noted that the abutting fins 114 is not necessarily needed to be completely spaced away from the elastic body 16 when the engine mount 200 is installed in position. The abutting fins 114 may be held in contact with the elastic body 16 so long as the contact of the abutting fins 114 with the elastic body 16 does not adversely effect on the damping characteristics of the engine mount 200 based on the elasticity of the elastic body 16.

Figure 14:
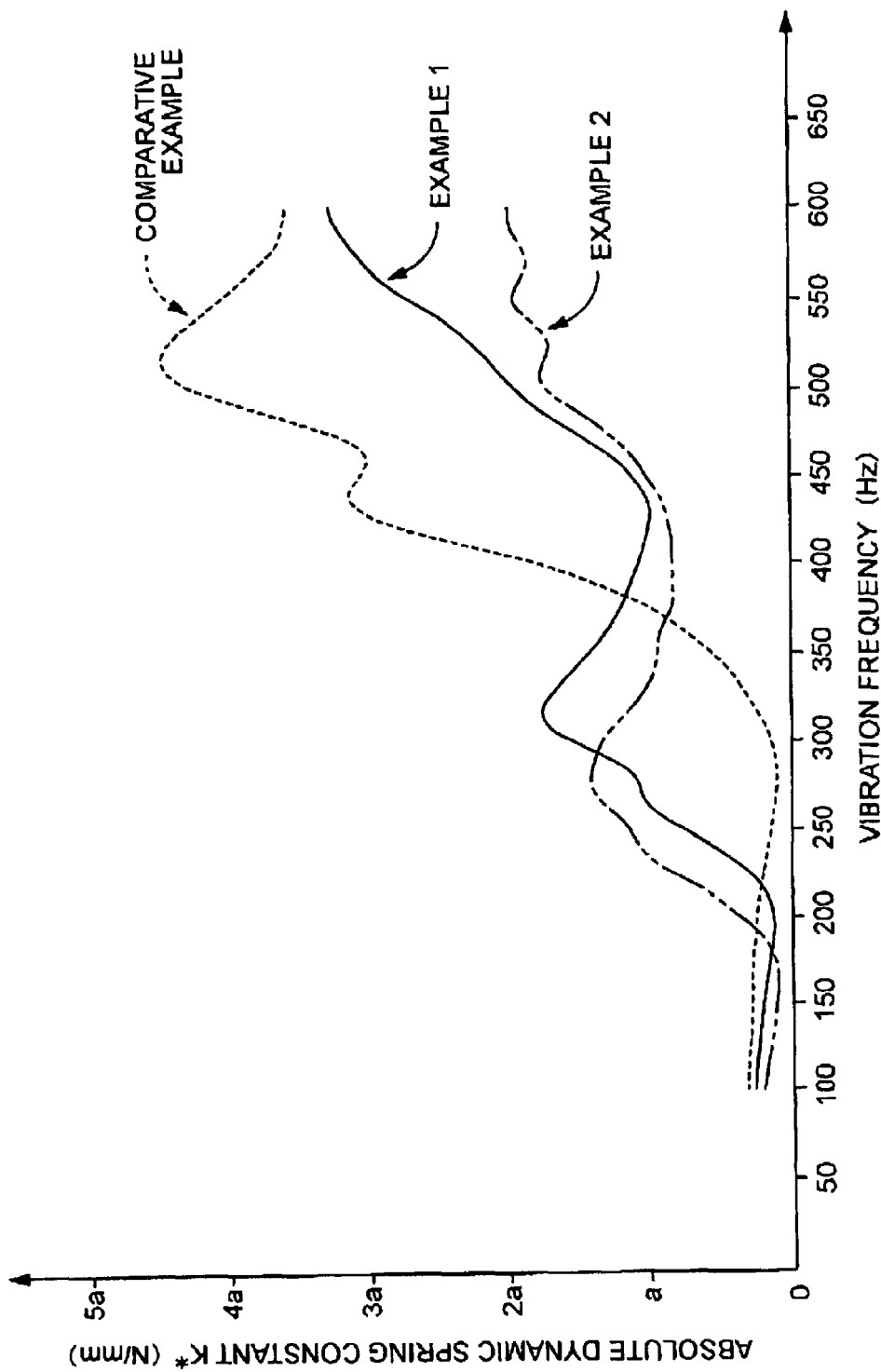
FIG. 14 is a graph showing frequency characteristics of absolute dynamic spring constant measured in the engine mounts according to the first and second embodiments, together with those measured in an engine mount according to a comparative example.

A first example of the engine mount constructed according to the first embodiment of the invention, and a second example of the engine mount constructed according to the second embodiment of the invention, were both subjected to a static load generally equal to the weight of a power unit installed on an actual automotive vehicle. Then, dynamic spring characteristics of the first and second examples of the engine mounts were actually measured in a direction corresponding to a longitudinal direction of the vehicle, when the inner shaft 12 was oscillated at an acceleration frequency of within a range of −5G through +5G in the longitudinal direction of the vehicle in which the pair of recesses 48, 48 are opposed to each other. The results of the measurements are indicated in the graph of FIG. 14 as an example 1 and an example 2. On the other hand, a comparative example of the engine mount, which has no restricting projection 84 fixed to the metallic partition member 50 was also examined in terms of its dynamic spring characteristics in the longitudinal direction of the vehicle in the same manner. The result of the measurement is also indicated in the graph of FIG. 14 as a comparative example 1.

As is understood from the graph of FIG. 14, the first and second examples of the engine mounts constructed according to the first and second embodiments of the present invention are capable of exhibiting a remarkably effective low dynamic spring characteristics with respect to higher frequency vibrations applied thereto in the longitudinal direction of the vehicle.

The results of measurements indicated in the graph of FIG. 14 also show that the second example of the engine mount can exhibit the improved low dynamic spring characteristics more than the first example of the engine mount, with respect to the higher frequency vibrations applied thereto in the longitudinal direction of the vehicle, based on the abutting fins 114 formed on the restricting projection 106.

While the present invention has been described in its presently preferred embodiments, it is to be understood that the invention is not limited to the details of the illustrated embodiments, but may be otherwise modified.

For instance, the number, positions and shape of the abutting fins 114 formed on the restricting projection 106 are not particularly limited to the second embodiment, but may be suitably determined taking into account required damping characteristics of the engine mount.

Figure 15:
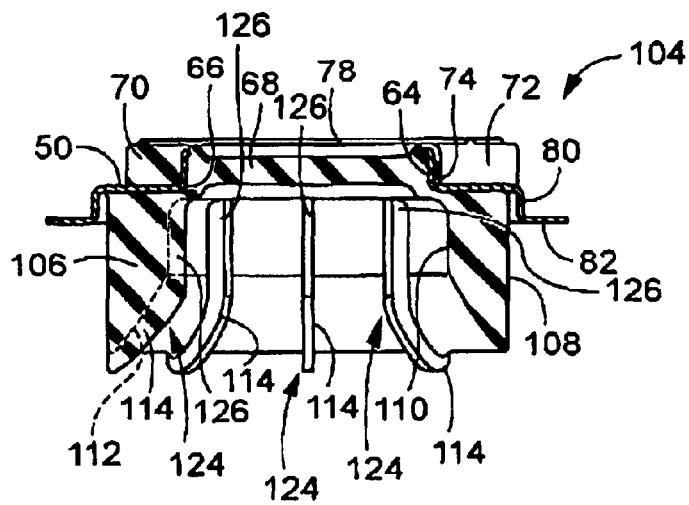
FIG. 15 is an axial or vertical cross sectional view of one example of a modified second integrally vulcanized assembly for use in the engine mount of the present invention, which is taken along line 15—15 of FIG. 16.
Figure 16:
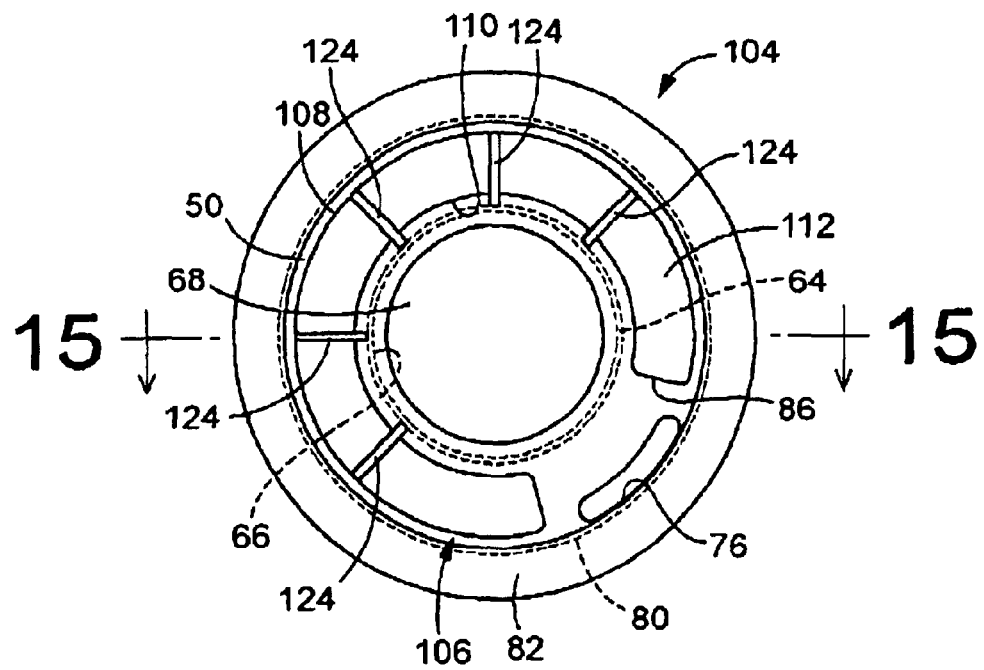
FIG. 16 is a bottom plane view of the second integrally vulcanized assembly of FIG. 15.
Figure 17:
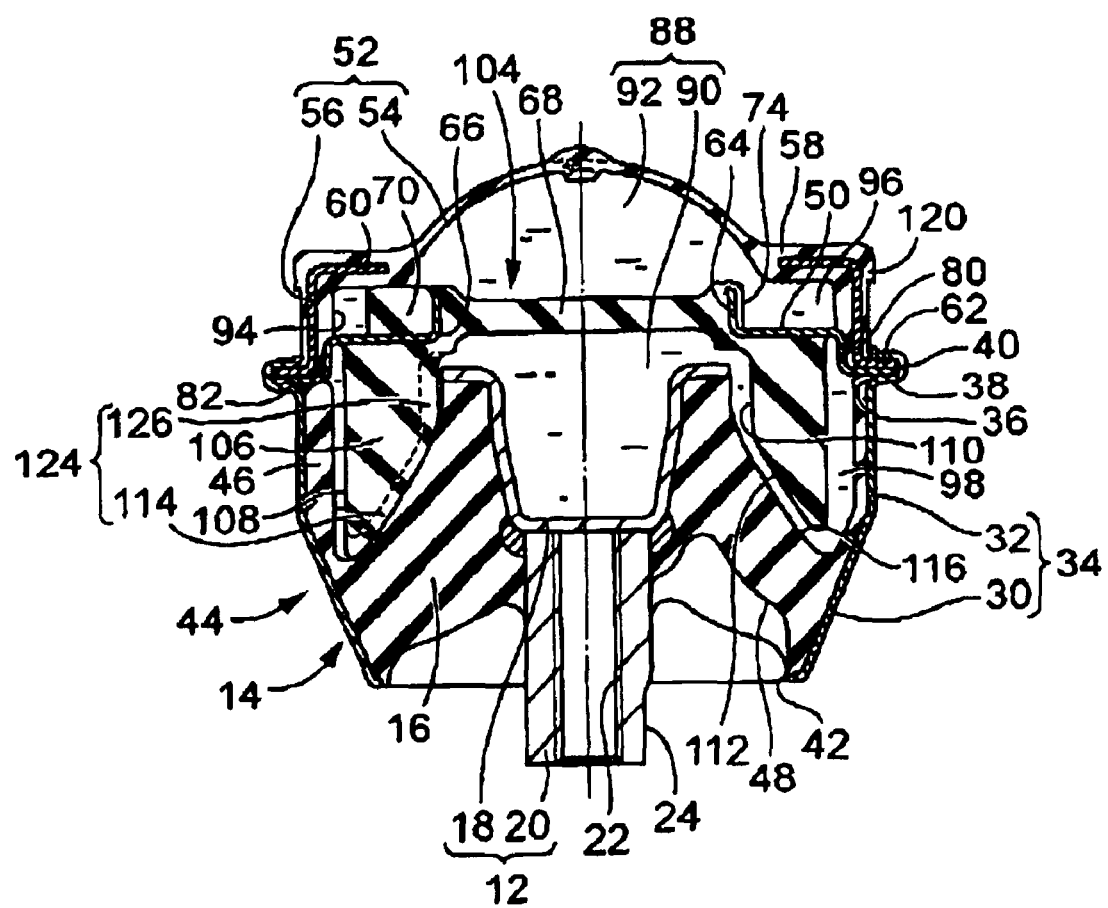
FIG. 17 is an elevational view in an axial or vertical cross section of the engine mount equipped with the second integrally vulcanized assembly of FIG. 15.
Figure 18:
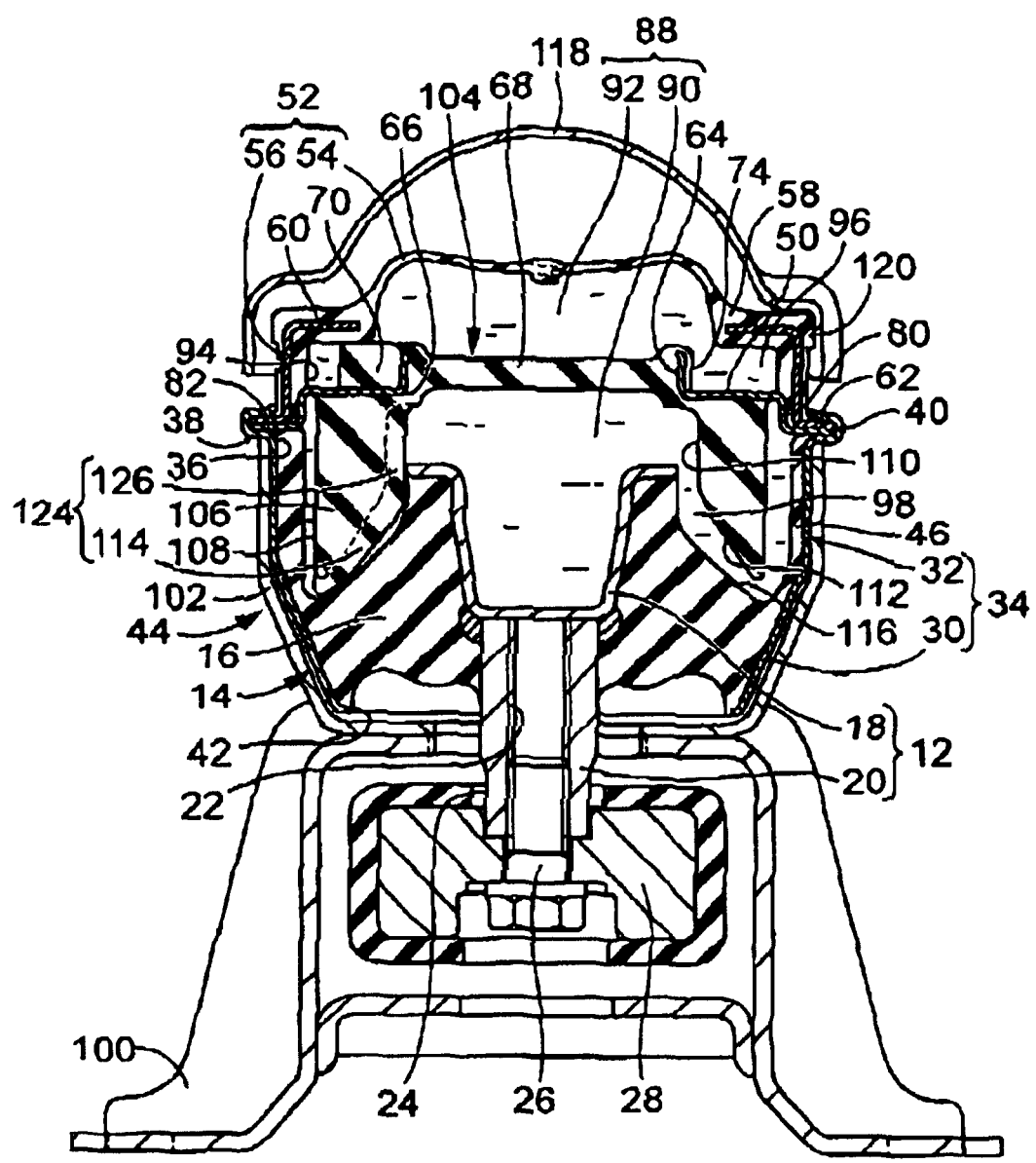
FIG. 18 is an elevational view in axial or vertical cross section of the engine mount of FIG. 17 in a state where the engine mount is installed on an automotive vehicle.

More specifically described, FIGS. 15 and 16 show one possible modification of the abutting fins 114 protruding from the tapered inner surface 112 of the restricting projection 106 of the engine mount 200 of the second embodiment, wherein the abutting fins 114 extend to the inner circumferential surface 110 of the restricting projection 106 so as to integrally form axial abutting fins 126 as second abutting fins each extending in the axial direction on the inner circumferential surface 110. In this modification, the abutting fins 114 formed on the tapered inner surface 112 and the axial abutting fins 126 formed on the inner circumferential surface 110 are formed into integral bodies as abutting projections 124 integrally formed on the restricting projection 106. As shown in FIGS. 17 and 18, the abutting projections 124 can restrict or reduce the annular region 98 in the pressure-receiving chamber 90 in a more effective manner, so that the engine mount provided with the abutting projections 124 is able to restrict or avoid its increase of the dynamic spring constant upon application of vibrations in the radial directions as much as or more than that in the second embodiment.

Figure 19:
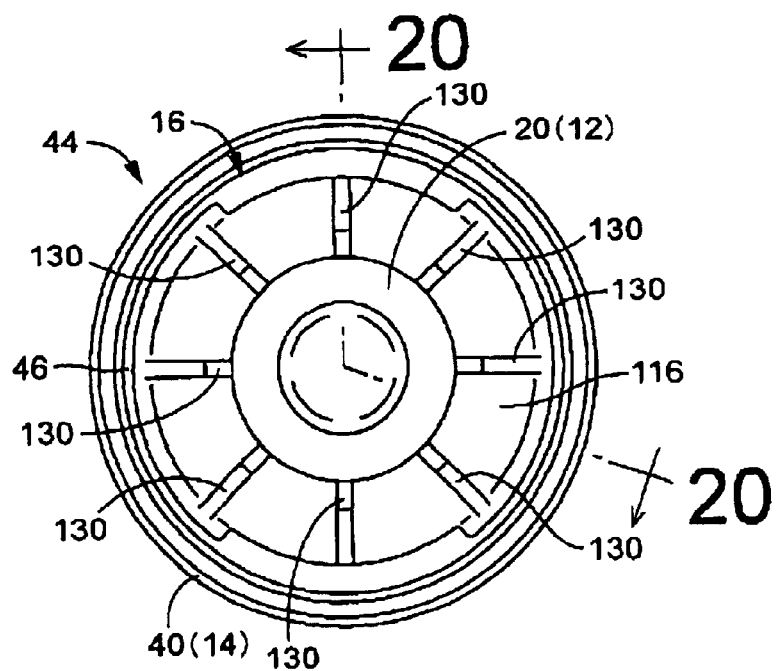
FIG. 19 is a top plane view of one example of a modified first integrally vulcanized assembly for use in the engine mount of the present invention.
Figure 20:
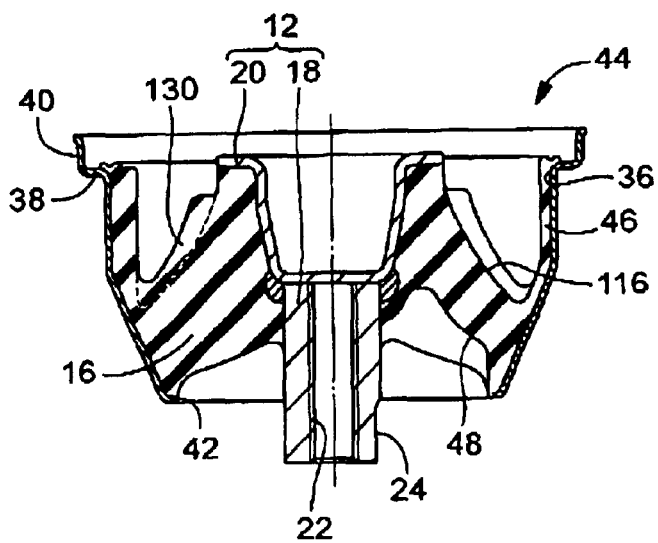
FIG. 20 is a cross sectional view taken along line 20—20 of FIG. 19.
Figure 21:
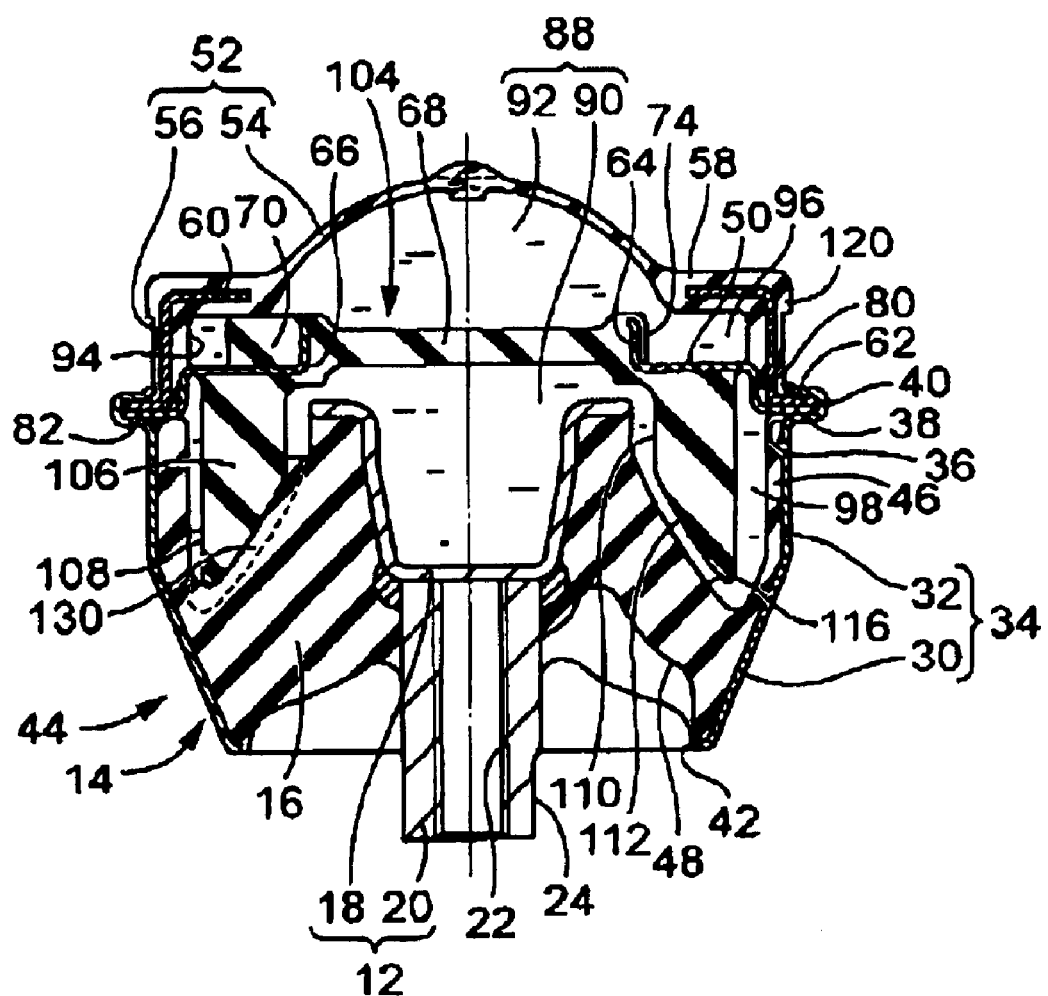
FIG. 21 is an elevational view in an axial or vertical cross section of the engine mount of the second embodiment wherein the first integrally vulcanized assembly of FIG. 19 is incorporated.
Figure 22:
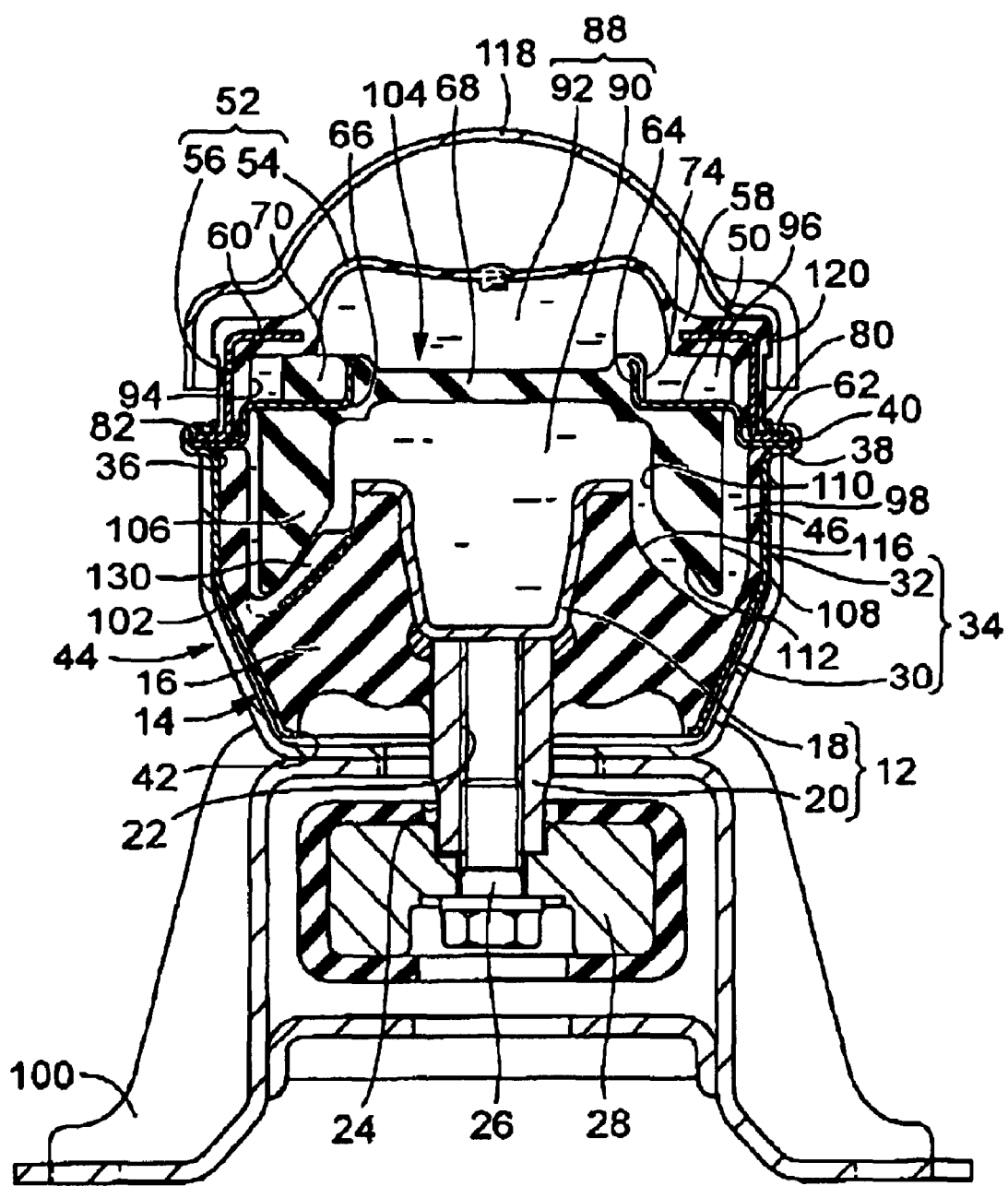
FIG. 22 is an elevational view in an axial or vertical cross section of the engine mount of FIG. 21 in a state where the engine mount is installed on the automotive vehicle.
Figure 23:
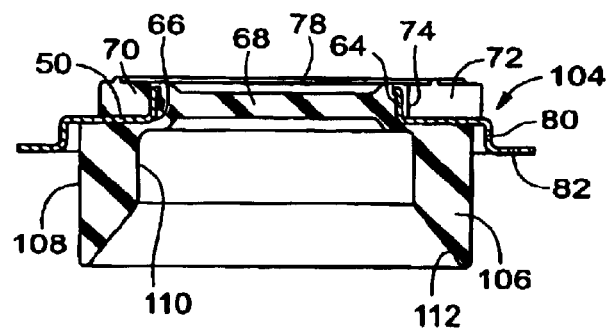
FIG. 23 is an axial or vertical cross sectional view of a second integrally vulcanized assembly of the engine mount of FIG. 21.
Figure 24:
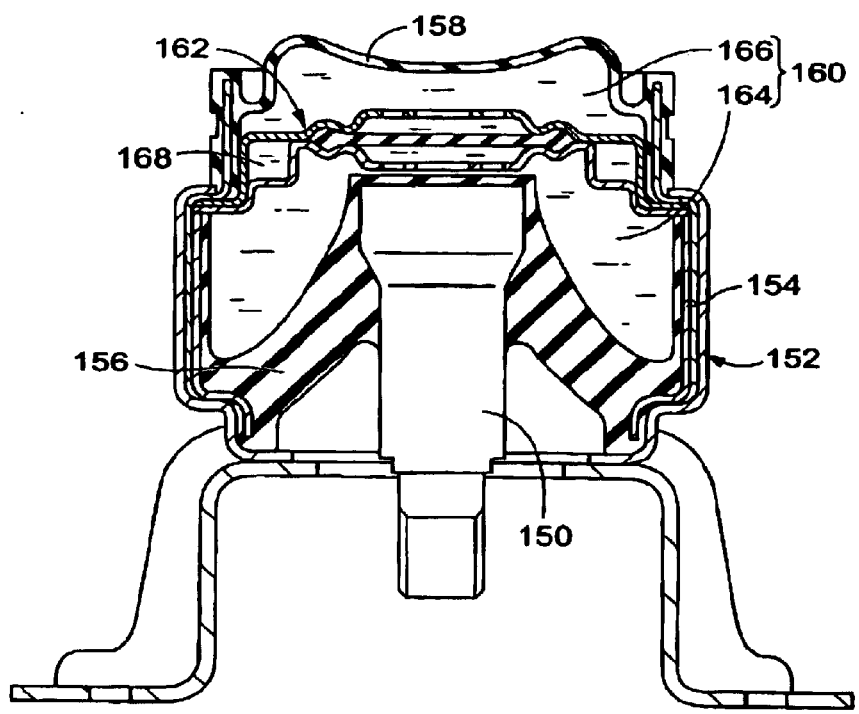
FIG. 24 is an elevational view in axial or vertical cross section of a conventional engine mount.

FIGS. 19 and 20 show another possible modification of the engine mount 200 according to the second embodiment. In this modification, a plurality of abutting fins 130 are formed on the tapered outer circumferential surface 116 of the elastic body 16 so as to protrude toward the restricting projection 106, instead of the abutting fins 114 integrally formed on the restricting projection 106. Each abutting fins 130 extends along the tapered outer circumferential surface 116 with a generally constant width dimension and a generally constant height dimension. When the engine mount provided with the abutting fins 130 is not installed on the vehicle, as shown in FIG. 21, protruding end faces of the abutting fins 130 are entirely held in contact with the tapered inner surface 112 of the restricting projection 106. When the engine mount provided with the abutting fins 130 is installed on the vehicle, as shown in FIG. 22, the elastic body 16 is elastically deformed due to the weight of the power unit acting on the engine mount so that the abutting fins 130 are moved away from the restricting projection 106 by a given amount in the axial direction. Therefore, the engine mount provided with the abutting fins 130 instead of the abutting fins 114, is able to reduce or avoid an increase of its dynamic spring constant upon application of vibrations over a higher frequency range in the radial directions, like the engine mount according to the second embodiment of the invention. In this modification, as shown in FIG. 23, the second integrally vulcanized assembly 104 includes no abutting fin. It may also possible to employ the second integrally vulcanized assembly 104 provided with the abutting fins 114 together with the elastic body 16 provided with the abutting fins 130 in combination. In this possible modification, the abutting fins protrude from both of the elastic body 16 and the restricting projection 106.

While the elastic rubber plate 68 is disposed in the through hole 66 of the metallic partition member 50 in the illustrated embodiment, the elastic rubber plate 68 is not essential to practice the present invention, but may be optionally employed while taking into account required damping characteristics of the engine mount.

The shapes and sizes of the restricting projection and the abutting fins are not particularly limited to those in the illustrated embodiments. For instance, the restricting projection may have a variety of shapes including an annular shape, an annular shape with height dimensions varying in its circumferential direction, and a plurality of circumferential segments divided from each other in the circumferential direction. The abutting fins may also have a variety of shapes including a tapered cross section, and a plurality of segments divided from each other in its protruding direction. It should be appreciated that any members capable of functioning to restrict the annular region 98 extending circumferentially between the elastic body 16 and the cylindrical portion 34 should be considered as the restricting members of the engine mount constructed according to the present invention.

In the illustrated embodiments, the abutting fins are arranged to be held in contact with the elastic body and/or the restricting projection, when the engine mount is subjected to no external load (i.e., in a non installation state), and to be moved away from the elastic body and/or the restricting projection, when the engine mount is subjected to a static load (i.e., in an installation state). The present invention is not particularly limited to this arrangement. The abutting condition of the abutting fins with respect to the elastic body and/or the restricting projection may be suitably determined by those skilled in the art with the required damping characteristics of the engine mount and efficiency in manufacturing the elastic body taken into consideration. For instance, the abutting fins may be arranged to be moved away from the elastic body and/or the restricting projection in the non installation state of the engine mount, and to be moved closer or in contact with the elastic body and/or the restricting projection in the installation state of the engine mount.

While each of the illustrated embodiments of the invention takes the form of a fluid-filled engine mount for an automotive vehicle, it is to be understood that the principle of the invention is equally applicable to body mounts for automotive vehicles, and the other suspension-type fluid-filled elastic mounts for various machines and other equipment other than automotive vehicles.

It is to be understood that the present invention may be embodied with various other changes, modifications, and improvement which may occur to those skilled in the art, without departing from the spirit and scope of the invention defined in the following claims.

What is claimed is:

1. A fluid-filled elastic mount of suspension type, comprising:

a first mounting member;

a second mounting member including a cylindrical portion extending in a vertical direction and having a vertically lower open-end portion in which said first mounting member is inserted and disposed;

a generally tapered elastic body interposed between said first and second mounting members so as to extend from said vertically lower open-end portion of said cylindrical portion of said second mounting member into an inside of said cylindrical portion for fluid-tightly closing said vertically lower open-end portion of said cylindrical portion of said second mounting member and for elastically connecting said first mounting member and said cylindrical portion of said second mounting member with each other;

a flexible layer fluid-tightly closing a vertically upper open-end portion of said cylindrical portion of said second mounting member for forming a fluid chamber defined between said generally tapered elastic body and said flexible layer and filled with a non-compressible fluid;

a partition member disposed within said fluid chamber so as to extend in a generally radial direction perpendicular to an axial direction of said cylindrical portion, and fixedly supported at an peripheral portion thereof by said second mounting member, for fluid-tightly dividing said fluid chamber into a pressure-receiving chamber partially defined by said generally tapered elastic body and an equilibrium chamber partially defined by said flexible layer;

an orifice passage for permitting a fluid communication between said pressure-receiving chamber and said equilibrium chamber; and a restricting projection formed of an elastic body and bonded to said partition member so as to protrude into said pressure-receiving chamber and located in an intermediate portion between said generally tapered elastic body and said cylindrical portion of said second mounting member opposed to said generally tapered elastic body in said generally radial direction, for restricting a generally annular region of said intermediate portion, wherein said restricting projection is arranged to be spaced away from both of said generally tapered elastic body and said cylindrical portion of the second mounting member.

2. A fluid-filled elastic mount according to claim 1, wherein said restricting projection has a tapered shape in cross section with a height dimension larger than a width dimension at a proximal end portion thereof.

3. A fluid-filled elastic mount according to claim 1, wherein said restricting projection has an outer circumferential surface extending generally straightly in said axial direction, and has an inner circumferential surface extending generally straightly in said axial direction from a proximal end portion to an intermediate portion thereof while extending in a direction inclined to said axial direction from said intermediate portion to a distal end portion thereof such that said inner circumferential surface gradually extends radially outwardly in an axially outward direction.

4. A fluid-filled elastic mount according to claim 1, wherein said restricting projection includes a cutout formed in at least one circumferential position thereof.

5. A fluid-filled elastic mount according to claim 1, wherein said partition member includes a through hole formed through a central portion thereof and fluid-tightly closed by a movable rubber layer disposed therein such that fluid pressures in said pressure-receiving chamber and said equilibrium chamber act on opposite surfaces of said movable rubber layer, respectively, said movable rubber layer being formed integrally with said restricting projection.

6. A fluid-filled elastic mount according to claim 1, wherein said partition member includes a cylindrical stepped portion formed at a radially intermediate portion thereof so as to extend continuously in a circumferential direction thereof, and said restricting projection bonded to an inner circumferential portion of said partition member located radially inward of said cylindrical stepped portion, in a process of vulcanization of a rubber material for forming said restricting projection, and an outer circumferential portion of said partition member located radially outward of said cylindrical stepped portion is fixed by caulking to said vertically upper open-end portion of said cylindrical portion of said second mounting member.

7. A fluid-filled elastic mount according to claim 1, further comprising at least one first abutting fin integrally formed with at least one of said generally tapered elastic body and said restricting projection such that said at least one first abutting fin is disposed in a space defined between axially opposite surfaces of said generally tapered elastic body and said restricting projection, so as to protrude from at least one of said surfaces of said generally tapered elastic body and said restricting projection toward an other one of said surfaces of said generally tapered elastic body and said restricting projection, for reducing or dividing said space at at least one circumferential position of said space.

8. A fluid-filled elastic mount according to claim 7, wherein said at least one first abutting fin comprises a pair of said first abutting fins formed on said surfaces of said generally tapered elastic body and said restricting projection so as to be opposed to each other in said generally radial direction.

9. A fluid-filled elastic mount according to claim 7, wherein said at least one first abutting fin comprises a plurality of said first abutting fins formed on said surfaces of said generally tapered elastic body and/or said restricting projection so as to be spaced away from each other in a circumferential direction.

10. A fluid-filled elastic mount according to claim 7, wherein said at least one first abutting fin is held in abutting contact with said other one of said surfaces of said generally tapered elastic body and said restricting projection, in a state where said elastic mount is not installed in position and no external load is applied between said first and second mounting members.

11. A fluid-filled elastic mount according to claim 7, wherein said at least one first abutting fin is spaced away from said other one of said surfaces of said generally tapered elastic body and said restricting projection, in a state where said generally tapered elastic body is elastically deformed so as to move said first mounting member vertically downwardly relative to said second mounting member due to a static load applied to said first mounting member in a direction of suspension.

12. A fluid-filled elastic mount according to claim 1, further comprising at least one second abutting fin integrally formed with at least one of said generally tapered elastic body and said restricting projection such that said at least one second abutting fin is disposed in a space defined between surfaces of said restricting projection and said generally tapered elastic body and/or said first mounting member, which are opposed to each other in said generally radial direction perpendicular to said axial direction, so as to protrude from at least one of said surfaces toward an other one of said surfaces, for restricting or dividing said space at at least one circumferential position of said space.

13. A fluid-filled elastic mount according to claim 1, wherein said flexible layer bonded at a peripheral portion thereof to an annular fixing metallic member, and said annular fixing member is superposed at a peripheral portion thereof on a peripheral portion of said partition member and fixed by caulking to said vertically upper open-end portion of said cylindrical portion of said second mounting member together with said partition member.

14. A fluid-filled elastic mount according to claim 13, wherein said annular fixing metallic member and said partition member cooperate to at least partially define therebetween said orifice passage so as to extend circumferentially at an outer circumferential portion of said partition member.

15. A fluid-filled elastic mount according to claim 1, wherein a wall thickness of said generally tapered elastic body varies in a circumferential direction thereof so that said generally tapered elastic body includes a pair of thick-walled portions opposed to each other in a first diametric direction with said first mounting member interposed therebetween and a pair of thin-walled portions opposed to each other in a second diametric direction with said first mounting member interposed therebetween, said first and second diametric directions are orthogonal with each other.

* * * * *